US012627952B2

(12) United States Patent
Rao et al.

(10) Patent No.: US 12,627,952 B2
(45) Date of Patent: May 12, 2026

(54) METHODS AND APPARATUS FOR SUPPORTING COLLABORATIVE EXTENDED REALITY (XR)

(71) Applicant: InterDigital Patent Holdings, Inc., Wilmington, DE (US)

(72) Inventors: Jaya Rao, Montreal (CA); Tejaswinee Lutchoomun, Montreal (CA); Senay Negusse, Montreal (CA); Ghyslain Pelletier, Montréal (CA); Janet Stern-Berkowitz, Little Neck, NY (US); Benoit Pelletier, Roxboro (CA); Caroline Baillard, Saint Sulpice la Foret (FR); Vincent Alleaume, Pace (FR); Nicolas Mollet, Meillac (FR); Anthony Laurent, Vignoc (FR)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 5 days.

(21) Appl. No.: 18/702,313

(22) PCT Filed: Nov. 2, 2022

(86) PCT No.: PCT/US2022/048687
§ 371 (c)(1),
(2) Date: Apr. 17, 2024

(87) PCT Pub. No.: WO2023/081197
PCT Pub. Date: May 11, 2023

(65) Prior Publication Data
US 2024/0422511 A1 Dec. 19, 2024

Related U.S. Application Data

(60) Provisional application No. 63/395,176, filed on Aug. 4, 2022, provisional application No. 63/326,631, filed
(Continued)

(51) Int. Cl.
H04W 4/08 (2009.01)
G06T 19/00 (2011.01)
H04W 4/02 (2018.01)

(52) U.S. Cl.
CPC ............ *H04W 4/08* (2013.01); *G06T 19/006* (2013.01); *H04W 4/02* (2013.01)

(58) Field of Classification Search
CPC .......... H04W 4/08; H04W 4/02; G06T 19/006
See application file for complete search history.

(56) References Cited

U.S. PATENT DOCUMENTS 8,730,312 B2 * 5/2014 Roebke ................ G06F 16/487
348/61
2014/0087770 A1 3/2014 Cho et al.
(Continued)

OTHER PUBLICATIONS

"3rd Generation Partnership Project"; Technical Specification Group Services and System Aspects; Extended Reality (XR) in 5G (Release 16), 3GPP TR 26.928 V16.0.0 (Mar. 2020) 131 pages.
(Continued)

*Primary Examiner* — Oanh Duong
(74) *Attorney, Agent, or Firm* — Chris Kolefas

(57) ABSTRACT

A method performed by an anchor wireless transmit/receive unit (WTRU) having an Extended Reality (XR) application includes transmitting to a base station (BS) a request for a candidate set of collaborative WTRUs, the request including pose information to identify the candidate set of collaborative WTRUs, receiving from the BS a first set of collaborative WTRUs, determining, by the anchor WTRU, a second
(Continued)

set of WTRUs from the first set of WTRUs that align with at least one of a Field of View (FoV) requirement, the pose information, and XR application parameters of the anchor WTRU, and transmitting, to the BS, an indication of the second set of WTRUs as selected collaborative WTRUs.

20 Claims, 14 Drawing Sheets

Related U.S. Application Data on Apr. 1, 2022, provisional application No. 63/275, 316, filed on Nov. 3, 2021.

(56) References Cited

U.S. PATENT DOCUMENTS

| | | | | |
|---|---|---|---|---|
| 2018/0150994 A1* | 5/2018 | Foutzitzis | ............... | G06T 17/20 |
| 2019/0173929 A1* | 6/2019 | Guardini | ............... | H04L 65/613 |
| 2019/0311513 A1* | 10/2019 | Han | ..................... | H04L 67/131 |
| 2019/0325771 A1* | 10/2019 | Ghatage | ................. | G06F 1/163 |
| 2019/0356758 A1* | 11/2019 | Finn | ..................... | G06F 3/1454 |
| 2020/0322403 A1* | 10/2020 | Dvir | ................... | H04N 21/2402 |
| 2021/0012577 A1* | 1/2021 | Stansell | ................. | G06F 3/011 |
| 2021/0250664 A1* | 8/2021 | Liu | .................. | H04N 21/44218 |
| 2021/0258376 A1 | 8/2021 | Croxford et al. | | |
| 2021/0333863 A1* | 10/2021 | Chen | ................... | G06V 40/172 |
| 2022/0053291 A1* | 2/2022 | Yip | ..................... | H04W 4/029 |
| 2022/0222900 A1* | 7/2022 | Tomizuka | ............ | G06T 19/006 |
| 2022/0254113 A1* | 8/2022 | Xu | ......................... | G06V 20/20 |
| 2024/0380953 A1* | 11/2024 | Nemeth | .............. | H04N 21/816 |

OTHER PUBLICATIONS

"3rd Generation Partnership Project; Technical Specification Group Radio Access Network; NR, NR and NG-RAN Overall Description; Stage 2 (Release 16)", 3GPP TS 38.300 V16.2.0, Jul. 2020, 148 pages.

* cited by examiner

Method
200

Start

Exchanging, by a WTRU with a Network, Assistance Information Useful for
Selection of a Network Node for Performing an Extended Reality (XR) Action ⌐ 210

Transmitting, by the WTRU to the Network, Pose Information of the WTRU ⌐ 220

Exchanging, by the WTRU with the Network, a Notification Regarding
Selection of the Network Node for Performing the XR Action ⌐ 230

End

600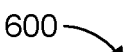

Receiving a Message Indicating an Invitation to Join a Collaborative
Group Supporting the Extended Reality (XR) Application ──605

No ◄──── 610
XR Capabilty
Compatible with
Invitation?

615
Sidelink Quality
Compatible with XR
Requirements? ────► No

Yes

620

Determining to Join a Collaborative XR Group

Yes

625

Transmitting on a Sidelink Connection,
the XR Capabilities of the Receiving Device

630

Optionally Respond to the Invitation Message
with to Decline or Provide no Response

FIG. 6

FoV (Field of View)

——— High Quality
- - - - - Low Quality

6 DoF Movement

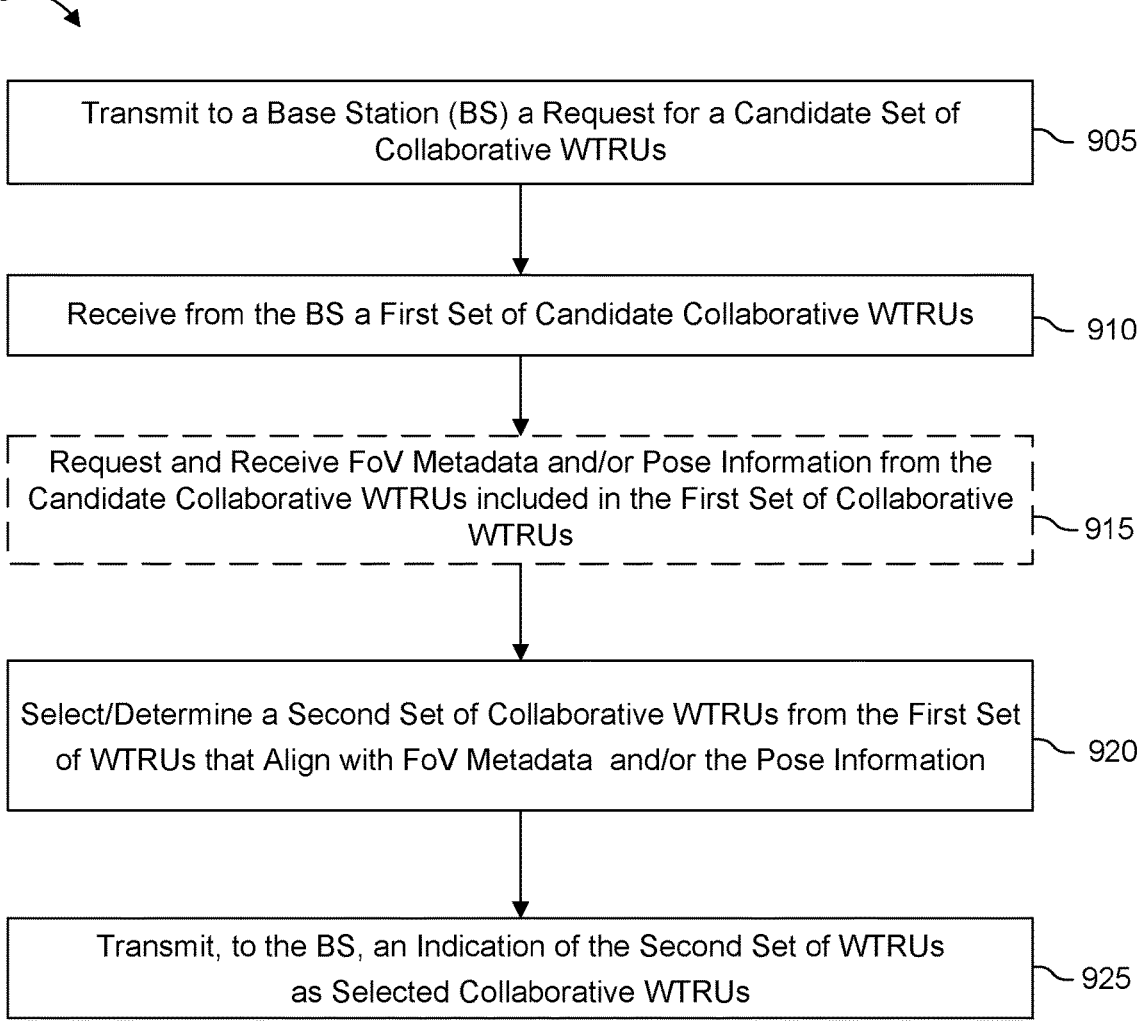

900

| Transmit to a Base Station (BS) a Request for a Candidate Set of Collaborative WTRUs | 905 |

| Receive from the BS a First Set of Candidate Collaborative WTRUs | 910 |

| Request and Receive FoV Metadata and/or Pose Information from the Candidate Collaborative WTRUs included in the First Set of Collaborative WTRUs | 915 |

| Select/Determine a Second Set of Collaborative WTRUs from the First Set of WTRUs that Align with FoV Metadata and/or the Pose Information | 920 |

| Transmit, to the BS, an Indication of the Second Set of WTRUs as Selected Collaborative WTRUs | 925 |

FIG. 9

METHODS AND APPARATUS FOR SUPPORTING COLLABORATIVE EXTENDED REALITY (XR)

CROSS REFERENCE TO RELATED APPLICATIONS

This application is a U.S. National Stage Application under 35 U.S.C. § 371 of International Patent Application No. PCT/US2022/048687, filed 2 Nov. 2022, which is incorporated herein by reference in its entirety.

This application claims the benefit of U.S. Provisional Patent Application Nos. 63/275,316 filed on 3 Nov. 2021, 63/326,631 filed on 1 Apr. 2022, and 63/395,176 filed on 4 Aug. 2022, each of which is incorporated herein by reference in its entirety.

TECHNICAL FIELD

The descriptions to follow include methods and apparatus for supporting collaborative eXtended Reality (XR) in which multiple devices contribute to an immersive Virtual Reality (VR) experience.

BACKGROUND

The term eXtended Reality (XR) is an umbrella term for different types of immersive experiences including Virtual Reality (VR), Augmented Reality (AR), and Mixed Reality (MR) and the realities interpolated among them. Virtual Reality (VR) is a rendered version of a delivered visual and audio scene. The rendering is designed to mimic the visual, stereoscopic (3D) and audio sensory stimuli of the real world as naturally as possible to an observer or user as they move within the limits defined by the application. Augmented Reality (AR) is when a user is provided with additional information or artificially generated items or content overlaid upon their current environment. Mixed Reality (MR) is an advanced form of AR where some virtual elements are inserted into the physical scene with the intent to provide the illusion that these elements are part of the real scene. XR may include all real-and-virtual combined environments and human-machine interactions generated by computer technology and wearables.

The term eXtended Reality (XR) is an umbrella term for different types of immersive experiences including Virtual Reality (VR), Augmented Reality (AR), and Mixed Reality (MR) and the realities interpolated among them. Virtual Reality (VR) is a rendered version of a delivered visual and audio scene. The rendering is designed to mimic the visual, stereoscopic (3D) and audio sensory stimuli of the real world as naturally as possible to an observer or user as they move within the limits defined by the application. Augmented Reality (AR) is when a user is provided with additional information or artificially generated items or content overlaid upon their current environment. Mixed Reality (MR) is an advanced form of AR where some virtual elements are inserted into the physical scene with the intent to provide the illusion that these elements are part of the real scene. XR may include all real-and-virtual combined environments and human-machine interactions generated by computer technology and wearables.

The notion of immersion in the context of XR applications/services refers to the sense of being surrounded by the virtual environment as well as providing the feeling of being physically and spatially located in the virtual environment. The levels of virtuality may range from partial sensory inputs to fully immersive multi-sensory inputs leading to a virtual reality practically indiscernible from actual reality.

Enabling immersive experiences will involve creation/definition of an experience space and accurate spatial mapping/sensing (e.g., using visual sensors, RF sensors) which may not be feasible for individual devices using existing mechanisms. From an application perspective, leveraging multiple devices allows augmenting and/or widening of WTRU's FoV, as well as accounts for blockages, occlusions, and blind spots. From a connectivity perspective, leveraging multiple devices allows alleviating the load on the Uu links and other interfaces (e.g., sidelink (SL) interfaces) of one or more WTRUs, involved in performing similar spatial mapping/sensing, by taking into account redundancy in the data content on Uu links and other interfaces.

Collaborative groups of devices can be used for fast and efficient discovery of devices with XR capabilities (e.g., visual sensing) over multiple interfaces (e.g., Uu, SL) and enable fast connectivity establishment. However, enabling the collaborative group to be dynamically updated (e.g., by selecting and including new devices and releasing existing devices) to ensure continuity of immersive experience to the user, based on user movement and changes in user FoV or extended FoV can be challenging.

In this regard, the challenge to be addressed is how a WTRU may dynamically coordinate a collaborate group formation/modification with multiple devices with similar/different capabilities, considering WTRU movement, for supporting XR experience and ensuring XR experience continuity.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein:

FIG. 6 depicts an example flow for a device receiving an invitation to join a collaborative XR activity;

FIG. 9 is an example method 900 according to an embodiment of the disclosure.

DETAILED DESCRIPTION

Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Example Communication Systems

Figure 1A:
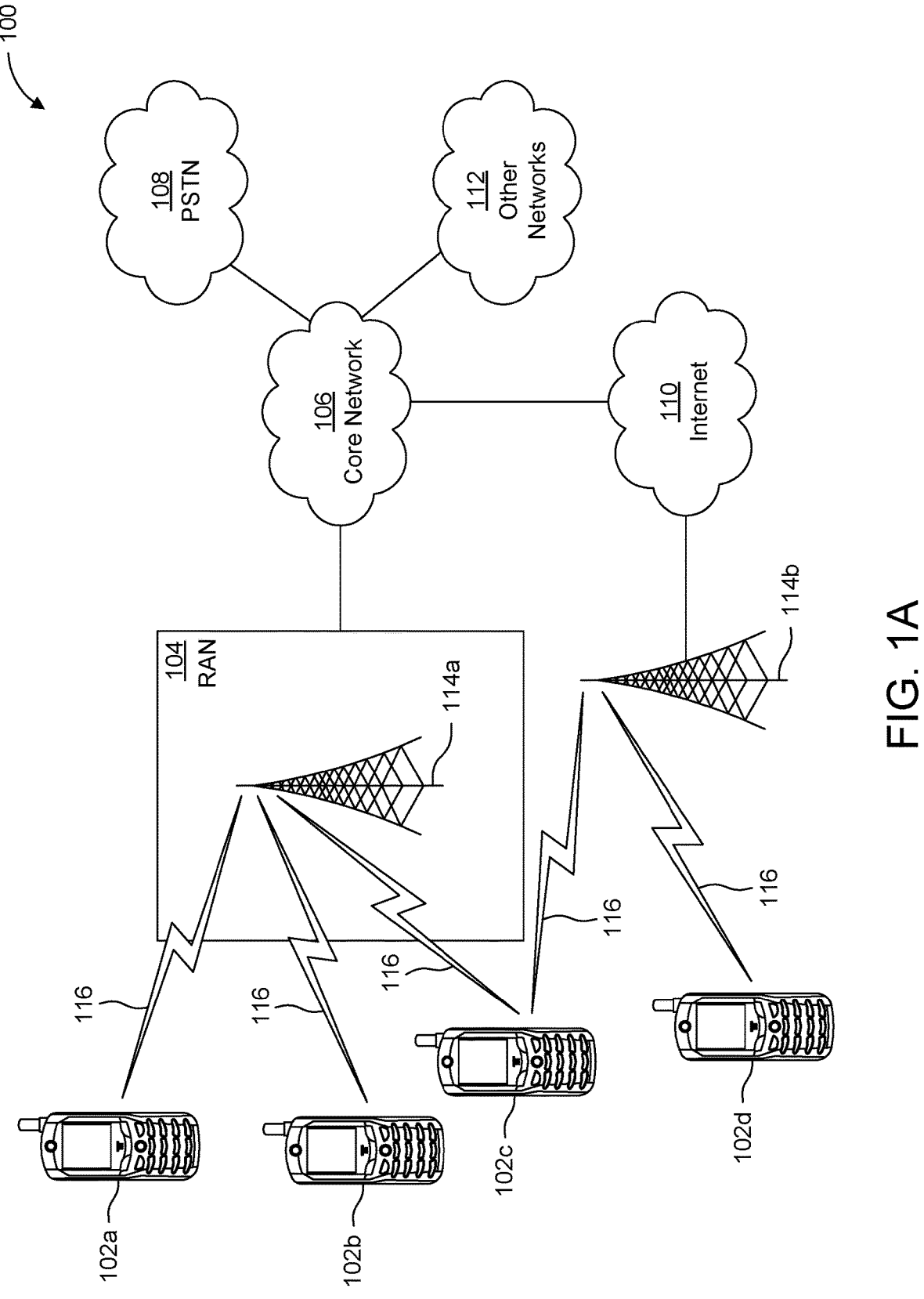
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
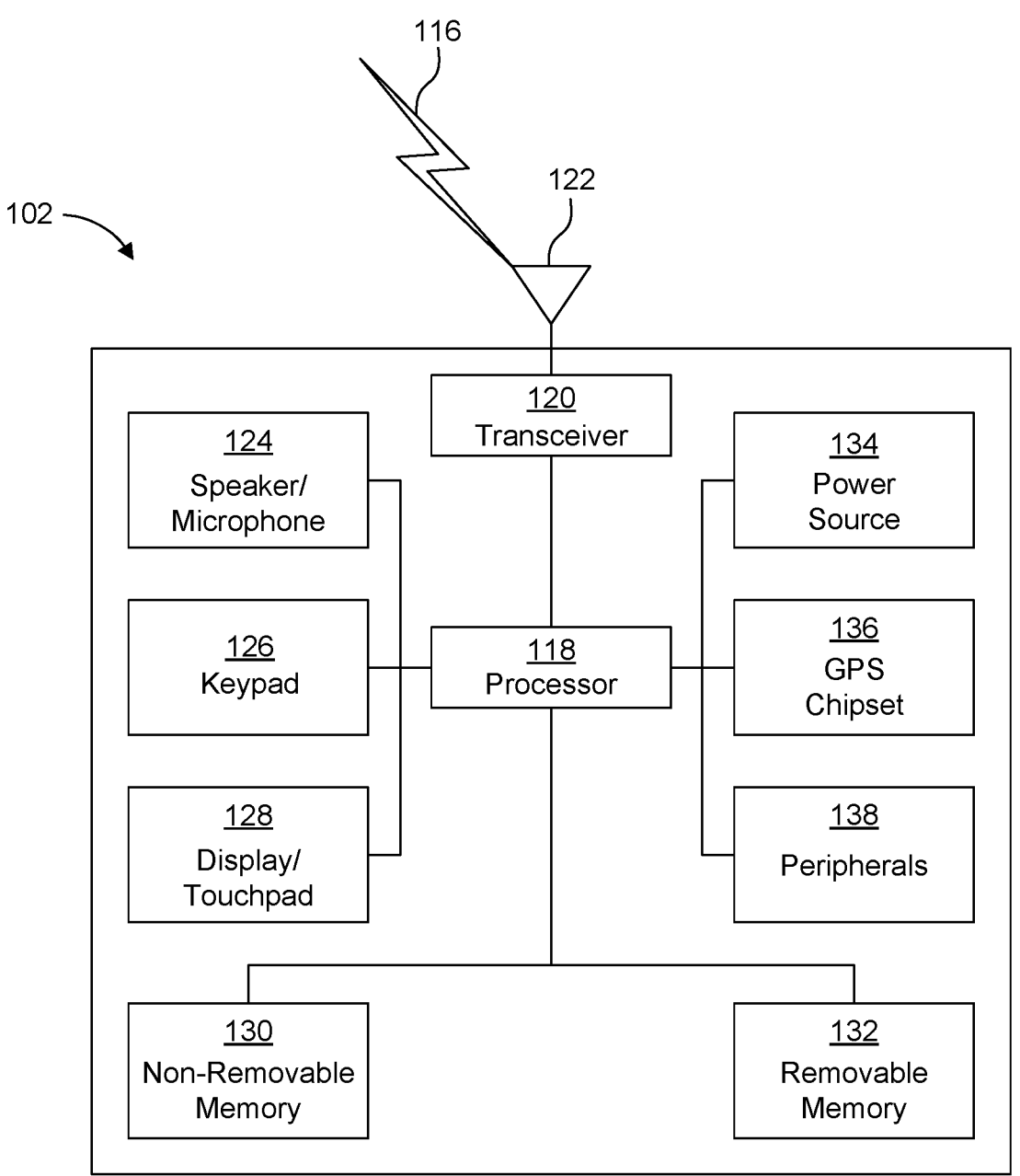
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
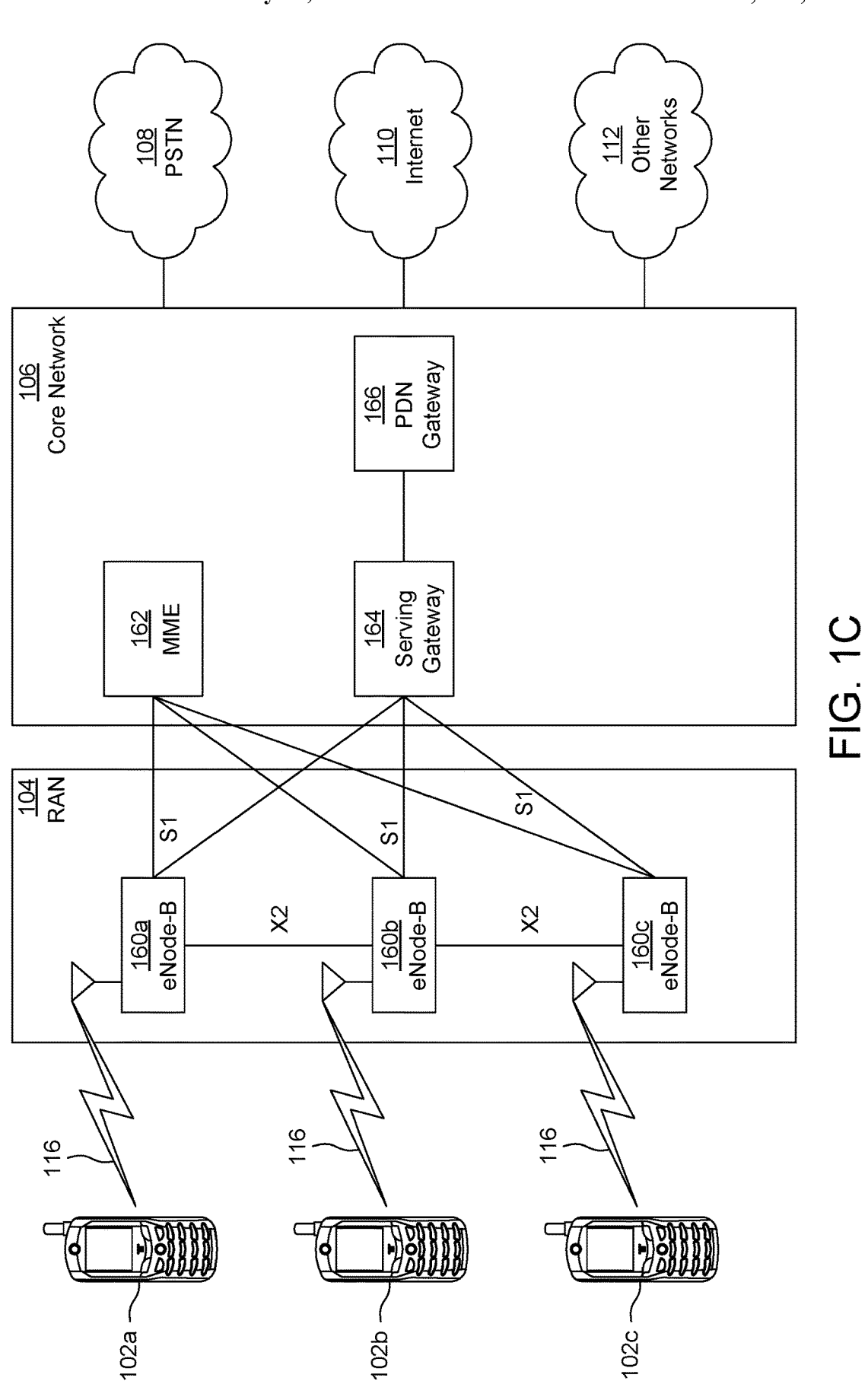
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
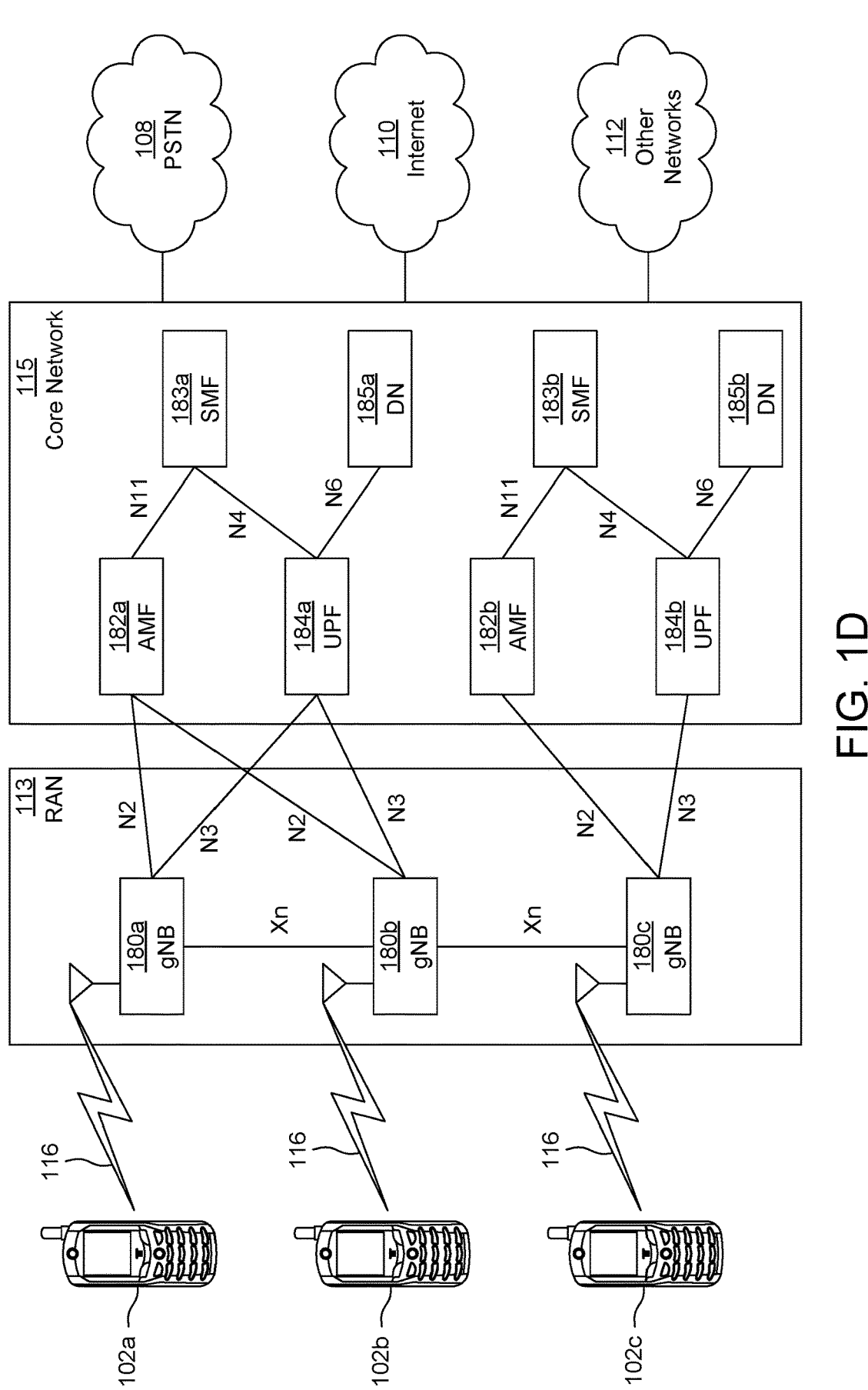
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the uplink (UL) and/or downlink (DL), support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF a82a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Examples provided herein do not limit applicability of the subject matter to other wireless technologies, e.g., using the same or different principles as may be applicable.

As explained herein, a wireless transmit/receive unit (WTRU) may be an example of a user equipment (UE). Hence the terms UE and WTRU may be used with equal scope herein.

Extended Reality (XR) in Legacy Systems

XR devices may typically be associated with capabilities that offer various degrees of spatial tracking. XR devices may be equipped with various sensors to enable spatial tracking, such as monocular/stereo/depth cameras, radio beacons, GPS, inertial sensors, etc. Possibly such spatial tracking may be performed at different levels, e.g., 3 Degrees of Freedom-DoF (i.e., rotational motion along X, Y, and Z axis), 6DoF (i.e., rotational and/or translational motion along X, Y and Z axis, and/or roll, pitch, yaw), etc. Possibly, such spatial tracking may result in an interaction to experience some form of virtual content. The user may act in and/or interact with the components within extended reality. For example, the actions and/or interactions may involve movements, gestures, eye tracking, etc. Spatial tracking is an important enabler for immersive XR experience. For example, some form of head and/or motion tracking may ensure that the simulated visual and audio components from the user perspective are updated to be consistent with the user's movements. Imprecise and/or delayed spatial tracking may lead to sensation of discomfort and/or motion sickness for the user.

In the descriptions to follow, a WTRU may correspond to any XR device/node which may come in a variety of form factors. A typical WTRU (e.g., XR WTRU) may include, but not be limited to the following: Head Mounted Displays (HMD), optical see-through glasses and camera see-through HMDs for Augmented Reality (AR) and Mixed Reality (MR), mobile devices with positional tracking and camera, wearables, etc. In addition to the above, several different types of XR WTRU may be envisioned based on XR device functions, for e.g., as display, camera, sensors, sensor processing, wireless connectivity, XR/Media processing, power supply, etc. to be provided by one or more devices, wearables, actuators, controllers, and/or accessories. One or more device/nodes/WTRUs may be grouped into a collaborative XR group for supporting any of the XR applications/services.

Traffic Models for XR Applications/Use Cases

In the following, the service/traffic flows of the different XR applications/use cases identified in 3GPP TR 26.928 Technical Specification Group Services and System Aspects; Extended Reality (XR) in 5G (Release 16) (V16.0.0).

Virtual Reality 1 (VR1)

VR1 applications (e.g., streaming of immersive 6DoF) can be modeled using service flows applicable for viewport dependent streaming architecture. Similar to adaptive streaming (e.g., desktop and mobile architecture for system hardware (DASH)), viewport dependent streaming allows for dynamically updating the quality of media/video based on available bitrate in the network and wireless interface. As per the service/traffic flow, the tracking and pose information, (e.g. small packet size: <100 bytes (B)) of the XR device's viewport is sent periodically with relatively low data rate (e.g., 0.5-2 Mbps, 60 to 500 Hz of periodicity) in the uplink (UL) to the XR server. In response, the XR server sends in the downlink (DL) with high data rate (e.g., 6-18 MBPS for 4 k omnidirectional and field of view (FoV) area streaming) and quasi-periodically (e.g., 40/60/120 frames per second (fps)) the viewport optimized media adaptively (e.g., H.264/265 video), which is then rendered in the XR device display. Pose information may include information regarding the orientation, location, and/or position of a device.

The traffic characteristics of VR1 are as follows, for example:
  a. UL: Pose/viewport information (e.g., including information on 6DoF):
    i. Small packet size (e.g., constant size<100 B), Low data rate: 0.5-2 Mbps, single flow; and
    ii. Periodic: (e.g., periodicity range of 60 to 500 Hz).
  b. DL: Media/Video containing viewport optimized scene (e.g., high quality) and media/video for non-viewport scene (e.g., lower quality):
    i. Large packet size (e.g., variable size with Gaussian distribution or fixed size of 1500 B), High data rate: 6-18 Mbps, end to end (E2E) latency: 50 ms, multi-flow (e.g., video flows with different bit-rates, 3D media, metadata); and ii. Quasi-periodic (e.g., periodicity as a function of frame rate of 40/60/120 fps).

Virtual Reality 2 (VR2)

VR2 applications (e.g., immersive game spectator mode) can be modeled using service flows which are applicable to the split rendering architecture. In this case, the XR server performs pre-rendering and encoding of the 2D media/video frame based on the pose information sent by the XR device periodically at low data rate (e.g., 0.5-2 Mbps, 60-500 Hz). The rendering is mainly performed in the XR-server and sent in DL at high data rate and low latency (e.g., 30-45 Mbps, 10-20 ms). The XR device decompresses the received media/video and performs asynchronous time-warping (ATW) for correcting the viewport based on latest pose information. While round trip time (RTT) latency for transmission of pose info in UL and reception of pre-rendered media in DL can span up to 50 ms, ATW enables satisfying the motion-to-photon latency requirement (e.g., <20 ms) based on in-device processing.

The traffic characteristics of VR2 are as follows, for example:
   a. UL: Pose/viewport information:
      i. Small packet size (e.g., constant size<100 B), Low data rate: e.g., 0.5-2 Mbps, single flow; and
      ii. Periodic (e.g., periodicity range of 60 to 500 Hz).
   b. DL: 3D scenes in frame buffers:
      i. Large packet size (e.g., Gaussian distribution, e.g., max 1500 B or unlimited), High data rate: 30-45 Mbps, latency: e.g., RTT 30 ms (typical) and max 50 ms, multi-flow (e.g., 3D video/media, metadata); and
      ii. Quasi-periodic (e.g., periodicity as a function of frame rate of 60/90 fps).

Augmented Reality 1 (AR1)

AR1 applications (e.g., real-time communication with shop assistant) can be characterized using service flows applicable to distributed computing architecture. As per the service/traffic flow, the XR device sends the pose information (e.g., 0.5-2 Mbps, 60-500 Hz) and/or video (e.g., 10 Mbps, 10 Hz frame update rate) in UL to the XR server. The received information is used by the XR server to generate the scene, which is then converted to 2D (e.g., video) or 3D media (e.g., 3D objects) format along with metadata (e.g., scene description). The compressed media and metadata (i.e., characterized by Pareto distribution) are delivered quasi-periodically in DL at high data rate (e.g., 30-45 Mbps, 40/60/120 fps). The XR device then generates the AR scene locally, by overlaying 3D objects on 2D video, and renders the scene in the device display.

The traffic characteristics of AR1 are as follows, for example:
   a. UL: Pose information and/or 2D video stream information:
      i. Pose: Small packet size, Low data rate of 0.5-2 Mbps, Periodic: 60 to 500 Hz; and
      ii. Video: Large packet size, Data rate of 10 Mbps, Periodic with update periodicity of 10 Hz, multi-flow video.
   b. DL: 2D/3D pre-rendered media and XR metadata:
      i. Large packet size (e.g., Pareto distribution), High data rate e.g., 30-45 Mbps, multi-flow (e.g., 2D/3D media and metadata); and
      ii. Quasi-periodic (e.g., periodicity as a function of frame rate of 60/90 fps).

Augmented Reality 2 (AR2)

AR2 applications (e.g., XR meeting, AR animated avatar calls) use service/traffic flows applicable for XR conversational architecture where two or more XR clients/devices can perform peer-to-peer communications with intermediary media processing in network. The different types of media that can be supported for AR2 applications, based on the type of user representation, include 2D+/RGBD (e.g., red green blue+depth at 2.7 Mbps), 3D mesh (e.g., 30 Mbps) or 3D Video point cloud coding (VPCC)/Geometry-based point cloud compression (GPCC) (e.g., 5-50 Mbps). In typical XR traffic flow, an XR client in the device initiates a call setup procedure, based on which a session control function triggers network-based media processing. The session control function also forwards the call setup to the second XR client/device followed by real-time media processing and streaming with low latency (e.g., end-to-end (E2E)<100 ms) to both clients. During an XR call, the 2D/3D media, and possibly the user pose information, is transmitted quasi-periodically in UL and DL between the XR clients/devices.

The traffic characteristics of AR2 are as follows, for example:
   a. UL: 2D/3D media, pose and/or video of user:
      i. Large packet size, e.g., data rate: 2.7-50 Mbps, PDB:<150 ms, multi-flow (e.g., 2D/3D media); and
      ii. Quasi-periodic (e.g., 60 to 500 Hz).
   b. DL: 2D/3D media, pose and/or video of user:
      i. Large packet size (e.g., truncated Gaussian distribution), Data rate: 2.7-50 Mbps, E2E PDB (Packet Delay Budget): <100 ms, multi-flow (e.g., 2D/3D media); and
      ii. Quasi-periodic (e.g., 60 to 500 Hz).

XR Conferencing

XR Conferencing applications provide an immersive conferencing experience between geographically remote users by representing the users in a 3D volumetric representation (e.g., point clouds or meshes). One or more cameras (e.g., with depth perception capability) can be placed at each users' location to allow interactions (e.g., view, hear, rotate, zoom-in, resize) with a full 3D volumetric representation of one another on their respective headsets/glasses. XR Conferencing applications support simultaneous UL and DL media traffic, with media consisting of audio, video and 3D objects. The media formats that can be applied to capture the user in 3D volumetric format include 2D+/RGBD (e.g., >2.7 Mbps for 1 camera, >5.4 Mbps for 2 cameras), and 3D Mesh (e.g., ~30 Mbps) and 3D VPCC/GPCC (e.g., 5-50 Mbps). The media processor can be located centrally or distributed at the edge. Additionally, the service/traffic flow between the XR clients/users via the in-network media processor is expected to be similar to the AR2 and XR conversational use cases. Joining an XR conference session may result in a download peak at the beginning for downloading the virtual environment and associated media objects within the XR application. Throughout the rest of the session, data rates can vary depending on number of users, upload format of the users, and refresh rates of virtual 2D/3D objects/environment.

The traffic characteristics of XR Conferencing are as follows:
   a. UL: 2D/3D media, pose and/or real-time video of user:
      i. Large packet size, Data rate: 2.7-50 Mbps, multi-flow (e.g., 2D/3D media);
      ii. Quasi-periodic (e.g., 60 to 500 Hz); and
      iii. Low encoder packet error rate (PER): <10-3.
   b. DL: 2D/3D media, pose and/or real-time video of user, 2D/3D objects/environment (e.g., possibly from third party):
      i. Large packet size, Data rate of 2.7-50 Mbps, E2E PDB: <100 ms, multi-flow (e.g., 2D/3D media);

ii. Quasi-periodic (e.g., 60 to 500 Hz); and iii. Low encoder PER: <10-3.

Cloud Gaming (CG)

CG applications (e.g., 5G online gaming) predominantly rely on an adaptive streaming architecture where the rendered video/media in network is streamed to a thin client in the device (e.g., smartphone, tablet). In a typical service/traffic flow for CG, the XR device sends the pose information (e.g., 100 to 250 B) related to viewport periodically in UL (e.g., 0.1-1 Mbps, 60-500 Hz) to the XR server. The generated viewport-related video/media (e.g., 1500 B) is encoded/compressed (e.g., H.264/265 video) and sent quasi-periodically by the XR server in DL (e.g., 30-45 Mbps, 30/50/60/90/120 fps, PER: 10e–3). The received video/media is then rendered in the XR device upon decoding and processing. The RTT latency for supporting certain high-end CG applications (e.g., Category D: photo-realistic or natural video games) is determined by the roundtrip interaction delay (e.g., 50 ms). For other CG applications (e.g., Category A, B, C), the uplink PDB is 10 ms and downlink streaming PDB can range from 50 ms to 200 ms.

The traffic characteristics of CG are as follows, for example:

a. UL: Pose/viewport information;
   i. Small packet size (e.g., 100 to 250 B), Low data rate: e.g., 0.1-1 Mbps, PDB: e.g., 10 ms, single flow; and
   ii. Periodic (e.g., periodicity range of 60 to 500 Hz).
b. DL: 2D/3D media and/or video of user:
   i. Large packet size (e.g., max 1500), High data rate 30-45 Mbps, PDB: 20 ms, multi-flow (e.g., 2D/3D media, video);
   ii. Quasi-periodic (e.g., periodicity as a function of frame rate of 30/50/60/90/120 fps); and
   iii. PER: 10e–3.

Throughout the embodiments described herein, the network may include any of a base station, gNB, transmit/receive point (TRP), RAN node, access node), core network function and application function (e.g., edge server function, remote server function), for example. Throughout the embodiments herein, flows may correspond to any of: QoS flows or data flows of data or protocol data units (PDUs), which may be associated with one or more QoS requirements (e.g., latency, data rate, reliability). Throughout the embodiments herein, forwarding configuration may correspond to any of: radio bearers, logical channels, configuration parameters in the individual layers within the access stratum protocol stack (e.g., service data adaption protocol (SDAP), packet data convergence protocol (PDCP), radio ink control (RLC), MAC, physical (PHY)); parameters associated with logical channel prioritization (LCP); and/or priority parameters (e.g., prioritized bit rate (PBR) and/or bucket size duration (BSD)) associated with mapping from data/QoS flows to radio bearers; parameters at SDAP, carriers, bandwidth parts (BWPs), and links, which may be used for delivering the packet data units (PDUs) in UL direction or DL direction, for example.

Overview of Collaborative XR

Brief Assumptions Associated with Collaborative XR

In this disclosure, "collaborative XR" may refer to, but not be limited to, one or more of the following concepts and definitions indicated in the following items labeled a-j:

Concept and/or Definition, Item a:

a. Supporting XR application/service, whereby one or more WTRUs may perform at least one XR related action resulting in providing XR experiences to the user, including:

i. enabling the sensation where the user may perceive full or partial immersion in different real/virtual environments; and ii. ability to interact with real and/or virtual objects, including avatars.

Concept and/or Definition, Item b:

b. A WTRU may include one or more of the following:
   i. Independent/stand-alone WTRUs/devices/nodes (e.g., XR device, XR glasses, smart watches);
   ii. Non stand-alone devices/nodes (e.g., devices associated with a WTRU, sensors, wearable devices, haptics gloves);
   iii. Devices/nodes controlled by a network (e.g., network operator);
   iv. Devices/nodes that may not be directly associated with and/or connected to a gNB, but may be candidate options given certain parameters (e.g., FoV metadata (e.g., size, dimension, quality, etc. of FoV), pose info);
   v. Stationary/static or moving/mobile devices/nodes/WTRUs; and/or
   vi. Throughout the embodiments described herein, the terms corresponding to any of WTRU, node, and device may be used interchangeably and may refer to any of the different WTRU types described above.

Concept and/or Definition, Item c:

c. The XR actions, performed completely or partially by one or more WTRUs/nodes/devices (e.g., anchor WTRU and/or collaborative WTRU as part of the collaborative XR group), may include the XR actions c (i)-c (viii) of the following paragraphs:

XR action, Item c (i):

i. Determining of FoV metadata:
   (1) For example, determining FoV metadata may involve determining any of the perimeter, size, border and boundaries of FoV, based on measurements in any spatial dimension, including but not limited to longitude, latitude, altitude, depth, roll, pitch, yaw in one more coordinate systems (e.g., cartesian, spherical). Spatial dimension can include one or more of location and orientation.
   (2). For example, determining FoV metadata may involve determining the quality of the FoV content (e.g., whether the FoV content is of high quality (e.g., which in the case of an image, can be quantified and assessed by the image resolution number of density of megapixels)); and
   (3). Determining FoV metadata may be done by one or more WTRUs:
      (i) For example, a WTRU may determine its own FoV dimensions. FoV dimensions may include, for example, one or more of size/dimensions of AR glasses/HMD, the physical size of the lens or the environment/scenery seen through the lenses of AR glasses or HMD. Examples can include perimeter/border/size/boundaries/angle width of FoV. In an example embodiment, FoV dimensions may include the physical size of the AR glasses or the object/environment that can be viewed through them. The FoV dimensions may be part of WTRU FoV metadata. A WTRU may determine its own FoV dimensions while another node may determine its own FoV dimensions (e.g., part of node FoV metadata); the WTRU FoV dimensions and the node FoV dimensions may be overlaid and/or compared against each other to determine the degree of overlap (e.g., 25% overlap, 50% overlap, 0% overlap) (e.g., determining FoV meta may be done for identifying the frames that belong to the overlapping section/segment. FoV size/dimensions as referred to throughout this document refers to metadata about the optics of the FoV (Field of View). It may include the physical dimensions of the AR glasses (e.g., perimeter/border/size/boundaries/angle width of FoV), which may be expressed in terms of measurements in any spatial dimensions, in one or more coordinate systems (e.g., cartesian, spherical), and/or the scenery/environment/object as viewed by the user through the AR glasses, possibly limited by the physical FoV dimensions of the AR glasses or augmented (e.g., through additional data from the application server) to maximize the obscured and/or non-obscured field of view.

XR action, Item c (ii):

ii. Determining of FoV content:

(1). For example, determining FoV content may involve determining the one or more 2D/3D image/video frames and/or geometric information associated with an FoV boundary/perimeter/border/depth/volume as defined by the FoV metadata by the WTRU/node for itself and/or on behalf of another WTRU/node. In an example, determining of FoV content may involve determining the 2.5D image, consisting of color and depth values associated with the 2.5D image (e.g., an image with 4 information field values per-pixel including values associated with colors (e.g., R,G,B) and depth (e.g., Z-value). In another example, determining FoV content may involve determining the point cloud representation using one or more point cloud representation options including any of Video Point Cloud Compression (V-PCC) and Geometry based Point Cloud Compression (G-PCC); for FoV content mapping, the WTRU may determine the images/video frames using visual sensors 2D/3D camera, light detection and ranging (LIDAR)), RF sensors (e.g., RF transceiver, radio detection and ranging (RADAR)), audio sensors, sound detection and ranging (SONAR)), etc.; herein, the mapping of FoV may also be referred to as sensing of FoV content or capturing of FoV content;

(2). For example, determining FoV content may also include recording/capturing of audio frames, either as part of the real environment or as part of an overlaid sound-track/audio file with the audio file originating from a source other than the current real environment being mapped; and/or (3). Determining of FoV content may be done partially or completely by one or more WTRUs/nodes:

(i) In an example, part of the FoV content (e.g., first FoV content) may be mapped/sensed by a first WTRU and another part of the FoV content (e.g., second FoV content) may be mapped/sensed by a second WTRU.

XR action, Item c (iii):

iii. Determining of extended FoV metadata (e.g., extended may also include enhanced, in terms of quality, which for images/videos/points cloud may mean increased resolution/density):

(1). For determining of extended FoV metadata, similar attributes and examples used for determining of FoV metadata may apply (e.g., described above); in addition, determining extended FoV metadata may include determining the metadata of an enlarged/ enhanced FoV beyond the capabilities and/or constraint(s) of the sensors/functions in the WTRU (e.g., beyond capabilities of cameras/sensors within the XR glasses WTRU/device):

(i). For example, defining an extended FoV metadata (e.g., dimension, size, resolution, density), may involve increasing the sense of immersion and/or immersiveness of the user in the XR experience;

(ii). In an example, determining extended FoV metadata (e.g., dimension, size, resolution) may involve the WTRU anticipating rapid movement of the user at a time instance and/or pre-emptively capturing a wider/higher quality FoV in anticipation of user's change in pose in the next time instance; and/or (iii). In an example, determining extended FoV metadata may involve the WTRU pre-emptively capturing a wider/higher quality FoV metadata in anticipation of upcoming low channel and/or radio link quality (e.g., when a user may be walking towards an underground location or tunnel).

XR action, Item c (iv):

iv. Determining of extended FoV content (e.g., extended may also include enhanced, in terms of quality, which for images/videos/points cloud may mean increased resolution/density):

(1). For determining of extended FoV content, similar attributes and examples used for determining of FoV content may apply (e.g., described above); in addition, determining extended FoV content may include determining the content of an enlarged/enhanced FoV beyond the capabilities and/or constraint(s) of the sensors/functions in the WTRU (e.g., beyond capabilities of cameras/sensors within the XR glasses WTRU/device):

(i). For example, determining extended FoV content may involve the WTRU capturing the same and/or larger FoV, with more content, and/or the same amount of content but with higher resolution and/or image quality;

(ii). For example, determining extended FoV content (e.g., video/image frames), may involve increasing the sense of immersion and/or immersiveness of the user in the XR experience;

(iii). In an example, determining extended FoV content may involve the WTRU anticipating rapid movement of the user at a time instance and/or pre-emptively capturing a wider/higher quality FoV in anticipation of user's change in pose in the next time instance; and/or (iv). In an example, determining extended FoV may involve the WTRU pre-emptively capturing a wider/higher quality FoV content in anticipation of upcoming bad channel and/or radio link quality (e.g., when a user may be walking towards an underground location or tunnel).

XR action, Item c (v):

v. Performing measurements:

(1). For example, the WTRU may perform measurements of pose (e.g., orientation, location/position) of the user and/or other objects with which the user may be interacting. Pose information may be considered to be the location and orientation of the WTRU (i.e., x, y, z coordinates for location and pitch, roll, and yaw information for orientation; and/or (2). In another example, the WTRU may perform measurements of the radio link interfaces associated with the WTRU (e.g., Uu link, SL).

XR action, Item c (vi):

vi. Handling/forwarding of data associated with XR actions:

(1). For example, data may include any of media/image/video frames, sensor data, and measurement data (e.g., pose measurements, link/channel measurements) determined by the WTRU, possibly for supporting an application/service/network request associated with the WTRU and/or on behalf of other nodes/devices;

(2). In an example, the WTRU may store the data associated with the FoV/extended FoV (e.g., both content and metadata) determined/mapped by the WTRU and/or on behalf of other WTRU;

(3). For example, the WTRU may send data, directly and/or on behalf of another WTRU, to one or more destinations including RAN node (gNB), CN function/entity, application function (e.g., hosted in WTRU or in network); and/or (4). For example, the WTRU may send and/or receive control signalling including acknowledgement/non-acknowledgement (ACK/NACK) messages, directly and/or on behalf of another WTRU, possibly for indicating availability/inability for performing any of XR actions.

XR action, Item c (vii):

vii. Handling/forwarding of information related to connectivity with network and/or other WTRUs:

(1). Sending capability information to a network, including capability for supporting one or more interfaces, capability to coordinate and/or interact with other WTRUs/devices (e.g., via sidelink interfaces), which may be co-located or non co-located with the WTRU, for example;

(2). Receiving a configuration, including receiving a radio resource control (RRC) configuration from a gNB and/or non-access stratum (NAS)-layer configuration from a CN;

(3). Sending requests and/or receiving responses to/from a network and/or other WTRUs for establishing/modifying connectivity;

(4). Sending requests for resource grants (e.g., dynamic grants, semi-static grants) for the WTRU and/or on behalf of other WTRUs;

(5). Triggering resource (re)selection for determining radio resources from configured resource pools;

(6). Performing measurements, including measurements of one or more of reference signals (RS) (e.g., synchronization signal block (SSB), channel state information reference signal (CSI-SR), positioning reference signal (PRS), sidelink RS), global navigation satellite system (GNSS) signals, unlicensed carriers, ultra-wideband signals, light detection and ranging (LIDAR) signals, visual signals, etc., for example;

(7). Triggering of transmission and/or measurement of reference signals in other one or more WTRUs (e.g., via Uu link and/or sidelink), for example; and/or (8). Sending of measurement report(s) to the network and/or another WTRU.

XR action, Item c (viii):

viii. In an example, one or more WTRUs/nodes, possibly associated with a collaborative group, may perform different XR actions, where the different WTRUs/nodes and different XR actions may be coordinated by one or more anchor WTRUs associated with the collaborative group. In another example, an XR action may be divided and/or performed by one more WTRUs/nodes, where an anchor WTRU may perform dividing of the XR action and/or coordinate with the other WTRUs/nodes in a collaborative group for performing the divided XR action. In another example, the same/similar XR action may be performed by one or more WTRUs/nodes associated with a collaborative group, where the XR action may be performed in parallel.

Concept and/or Definition, Item d:

d. A collaborative group may comprise one or more WTRUs, where a first WTRU may be designated as an anchor WTRU and a second WTRU may be designated as a collaborative WTRU.

Concept and/or Definition, Item e:

e. An anchor WTRU, in the context of collaborative XR, may refer to any WTRU involved in performing one or more of the following:

i. Hosting of the application function (e.g., XR application) from which a request for any XR actions may be received;

ii. Receiving the request for an XR action from an application function located in the network (e.g., edge server, remote server);

iii. Initiating a discovery procedure for determining other WTRUs/devices/nodes in proximity for performing any XR actions in a collaborative group;

iv. Establishing a session (e.g., XR session, PDU session, application session) by sending/receiving a request for session establishment and operating as the primary anchor point for communicating with a RAN function/node (e.g., gNB), CN function and/or application function, including sending and/or receiving any session related messages (e.g., capability transfer, assistance info transfer, configuration transfer, measurement info, XR action status info, session activation/deactivation, session release); and/or v. When supporting a connection to the network, the interface between an anchor WTRU and network gNB) may be referred to as primary Uu link.

Concept and/or Definition, Item f:

f. A collaborative WTRU, in the context of collaborative XR, may refer to any WTRU involved in performing one or more of the following:

i. Initiating a discovery procedure and/or receiving a request for making the WTRU discoverable (e.g., via sidelink or via network) for performing any of the XR actions;

ii. When supporting a connection to the network, the interface between collaborative WTRU and network (e.g., gNB) may be referred to as secondary Uu link;

iii. Sending information related XR actions (e.g., pose info, FoV parameters including direction, width of FoV, and other FoV metadata, user plane (UP) data containing the captured/mapped FoV content and/or media/video frames, assistance info, status info) directly to the network (e.g., gNB, CN function, application function) and/or indirectly to an anchor WTRU;

iv. Receiving information (e.g., RRC configuration info, application configuration info), which may be used for determining any of the XR actions, possibly along with an anchor WTRU;

v. Sending XR actions related messages/reports to an anchor WTRU and/or network, including pose and/or FoV measurements and estimates over sidelink interfaces (e.g., NR sidelink, Bluetooth, WiFi Direct.); and/or vi. A collaborative WTRU may be associated with different collaborative groups and anchor WTRUs.

Concept and/or Definition, Item g:

g. The terminologies used in this disclosure, related to 'anchor WTRU' and 'collaborative WTRU', are non-limiting examples. Other terminologies that may be used when referring to an anchor WTRU may include 'central WTRU', 'primary WTRU', 'main WTRU', 'initiating WTRU', etc. Other terminologies that may be used when referring to a collaborative WTRU may include 'assisting WTRU', 'supporting WTRU', 'secondary WTRU', etc.

Concept and/or Definition, Item h:

h. The different attributes described above, including collaborative group, anchor WTRU, collaborative WTRU, and XR actions may be associated with different identifiers/IDs (e.g., collaborative group ID, per-group anchor WTRU ID, per-group collaborative WTRU ID, XR action ID). The different identifiers/IDs associated with collaborative XR may be assigned/configured, for example, by any of the following: WTRU, network, application function.

Concept and/or Definition, Item j:

j. Tertiary WTRU may be a type of WTRU, associated with a role in the collaborative group and functional capabilities, similar to the secondary WTRU. It may be involved in XR action for a shorter duration and/or for smaller partial task, and as a result may require a partial configuration (e.g., may take less time to complete or perform an XR action and/or with less overhead).

Figure 2:
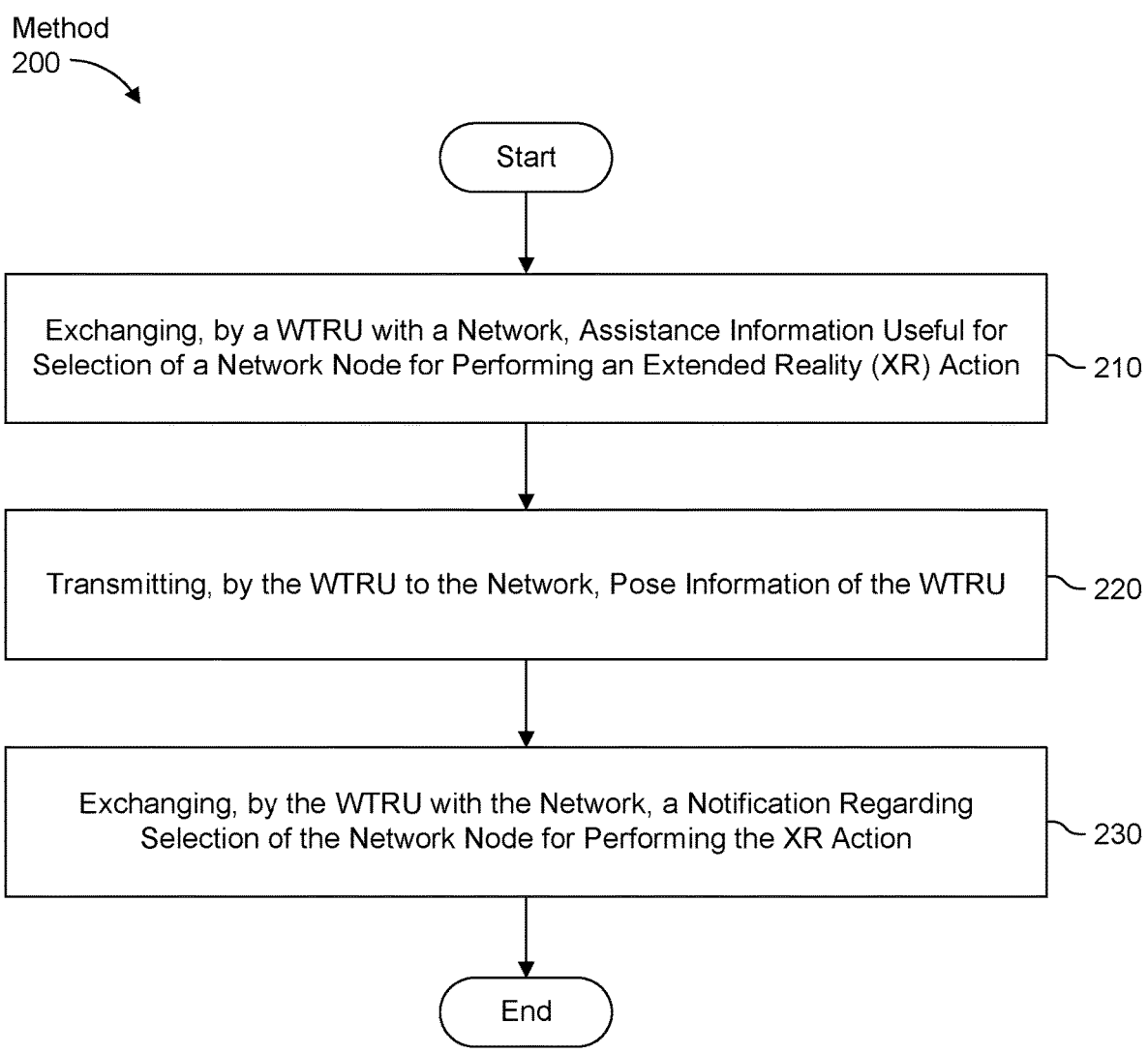
FIG. 2 is a flow diagram illustrating a method of supporting device group for collaborative extended reality (XR)

Referring to FIG. 2, a method 200 implemented by a WTRU supports collaborative XR. At step 210, the method may include exchanging, by a WTRU with a network, assistance information useful for selection of a network node for performing an extended reality (XR) action. At step 220, the method may include transmitting, by the WTRU to the network, pose information of the WTRU. At step 230, the method may include exchanging, by the WTRU with the network, a notification regarding selection of the network node for performing the XR action.

The steps 210-230 of FIG. 2 may include additional operations. For example, the WTRU may be an anchor WTRU that selects the selected node. In such implementations, exchanging the assistance information at step 210 may include transmitting, by the WTRU to the network, its capability information and a request for the assistance information, and receiving, by the WTRU from the network, information about nodes of the network, wherein the information includes, for each of at least one node, a node configuration, a pose information, a field of view (FoV) size, and a pose difference threshold. Additionally, the method 200 may include selecting, by the WTRU, one of the nodes of the network as the selected node based on the WTRU's own pose information, the pose information of the selected node, the FoV size of the selected node, and the pose difference threshold. Also, exchanging the notification at step 230 may include transmitting, by the WTRU to the network, an indication of the selected node and a request to activate the selected node. Further, the method 200 may include receiving, by the WTRU from a network, an activation indication confirming activation of the selected node, and transmitting, by the WTRU in response to the activation indication, an indication to the selected node.

In implementations in which the WTRU is an anchor node that selects the selected node, the steps 210-230 of method 200 may include further operations. For example, the additional operations may include determining, by the WTRU, that its movement exceeds a movement threshold, determining, by the WTRU, its own updated pose information in response to the determination that its movement exceeds the movement threshold, and determining, by the WTRU, a difference between its own updated pose information and its own pose information used in selecting the selected node. Additionally, the operations may include determining, by the WTRU, that the difference does not exceed the pose difference threshold, and transmitting, by the WTRU to the network, its own updated pose information in response to determining that the difference does not exceed the pose difference threshold of the selected node. Also, the operations may include determining, by the WTRU, that the difference exceeds the pose difference threshold of the selected node; in response to determining that the difference exceeds the pose difference threshold, the operations may include selecting, by the WTRU as another selected node, another one of the nodes of the network based on the WTRU's own updated pose information, the pose information of the selected node, and the FoV size of the selected node. In such cases, the operations may further include transmitting, by the WTRU to the network, an indication of the selected node and a request to activate the selected node, receiving, by the WTRU from the network, another activation indication confirming activation of the selected node, and transmitting, by the WTRU in response to the other activation indication, another indication to the selected node.

In other instances, the WTRU may be an anchor node that assists the network in selection of the selected node. In these embodiments, exchanging the assistance information at step 210 may include transmitting, by the WTRU to the network, its location and capability information, and receiving, by the WTRU from the network, WTRU metadata, a WTRU movement threshold, a pose difference threshold, and WTRU extended field of view (FoV) metadata. In such implementations, steps 210-230 of method 200 may include additional operations such as transmitting, by the WTRU to the network, an XR action request, XR action information, the WTRU FoV extended metadata, and a desired configuration of data. Also, exchanging the notification at step 230 may include receiving, by the WTRU from the network, an identity of the selected network node, a quality of service (QoS) configuration of the selected network node, and a pose difference threshold of the selected network node. In such implementations, the additional operations may include transmitting, by the WTRU to the network, its own updated pose information.

In still other instances, the WTRU may correspond to the selected node, in which case exchanging the assistance information at step 210 may include receiving, by the WTRU from the network, a request for the assistance information, and transmitting, by the WTRU to the network, a node identity, a pose information, dimensions of field of view (FoV) and a pose difference threshold. Exchanging the assistance information at step 210 may also include receiving, by the WTRU from the network, a configuration activation request and a quality of service (QoS) configuration for XR, and transmitting, by the WTRU to the network, an acknowledgement in response to the configuration activation request. In these implementations, exchanging the notification at step 230 may include receiving, by the WTRU from the network, an XR action initiation request and an identity of a server identity. Further, additional operations carried out by steps 210-230 of method 200 may include transmitting, by the WTRU to the server, FoV content, receiving, by the WTRU from the network, a deactivation request, and transmitting, by the WTRU in response to the deactivation request, a status report to at least one of the network or the server.

Determining a Device Group for a Collaborative XR

In some embodiments, the WTRU may determine a collaborative group by selecting and/or assisting the network to select an WTRUs/node/device for supporting one or more XR actions associated with sessions/applications/services. The WTRU may perform selection and/or assist the network for selecting WTRUs/nodes based on any of the following: threshold values, configurations, triggering events, conditions/criteria received from network and/or application (e.g., application function hosted by the WTRU).

In an example, the WTRU may perform discovery and/or selection of an alternative node based on the changes in the pose of the WTRU and/or changes in the FoV attributes of the WTRU such that the selected node, possibly along with the WTRU, may be used for supporting one or more XR actions (e.g., sensing with different FoV dimensions, forwarding/routing data).

WTRU Discovers Other WTRUs in Proximity for Performing XR Actions in Collaborative Group In an embodiment, a WTRU establishes a group comprising one or more collaborative WTRUs/devices/nodes based on certain configured conditions/criteria (e.g., described further herein) for collaborative XR. The establishment of a group consisting of at least an anchor WTRU and one or more collaborative WTRUs may be applicable for both WTRU-assisted and WTRU-based collaborative XR cases, described as follows:

a. WTRU-based collaborative XR: Anchor WTRU performs selection of one or more nodes/WTRUs to be included in a collaborative group for performing any of XR actions, based on assistance information and/or configuration information received from network; and/or b. WTRU-assisted collaborative XR: Anchor WTRU assists the network for performing selection of one or more nodes/WTRUs to be included in a collaborative group for performing any of XR actions, by providing assistance information and/or preferred configuration information (e.g., preferred to be supported in the selected nodes) to network.

In an example, the anchor WTRU and one or more collaborative WTRUs, in both WTRU-based and WTRU-assisted cases, may share a group session at AS-layer (e.g., group RRC connection/entity), NAS-layer (e.g., group PDU session), or application layer session. In another example, the anchor WTRU and one or more collaborative WTRUs may use their respective sessions. In these scenarios, the group session or individual sessions (e.g., IDs) may be used by the WTRUs for receiving assistance/configuration information, performing one or more XR actions, and sending status reports/UP data (e.g., associated with XR actions) to network one and another (e.g., directly via SL or indirectly via network).

In an example, an anchor WTRU may discover one or more other WTRUs/nodes using the following procedure:

a. Discovery for collaborative XR:
      i. WTRU may indicate to network (e.g., via Uu interface) its availability for supporting any of XR actions; and/or ii. WTRU may make itself visible/detectable to other WTRUs by sending a discovery message over sidelink interface (e.g., sidelink broadcast channel), indicating its capability to support collaborative XR.

b. Solicitation for collaborative XR:
      i. WTRU may send a request message to network (e.g., via Uu interface) for requesting the availability of one or more nodes for performing any of the XR actions; and/or
      ii. WTRU may inquire other WTRUs by sending a solicitation message over sidelink (e.g., sidelink unicast/broadcast channel), requesting other WTRUs/nodes in proximity on whether any of XR actions may be supported.

The information that may be sent by the (e.g., anchor) WTRU in discovery/solicitation message(s) to the network and/or other WTRUs may include one or more of the following:

a. Identifiers/IDs:
      i. For example, the WTRU may send one or more IDs including any of the following: application/service/session ID, WTRU ID, collaborative group ID, XR action ID (e.g., XR actions supported by WTRU and/or requested to be performed by other WTRUs);

b. Capability info:
      i. For example, the WTRU may request the XR capability for the other WTRU(s) to support one or more XR actions (e.g., sensing FoV). In an example, the anchor WTRU may include a list of one or more XR actions supported by the anchor WTRU, possibly along with a preference value associated with the XR action; in this case, a collaborative WTRU may respond if its own preference value for supporting an XR action matches/aligns with that indicated by the anchor WTRU, for example;
      ii. For example, the WTRU may request connectivity capability of other WTRU(s), including the capabilities on Uu link and/or SL interfaces; the connectivity capabilities on the different interfaces may include, the bandwidth, number of carriers, number of Tx/Rx antennas, supported forwarding configurations, etc.; and/or
      iii. For example, the WTRU may also include the XR capability and connectivity capability information of itself in the discovery/solicitation messages.

c. Request for transmission of data associated with XR action(s):
      i. For example, the WTRU may request the other WTRUs to trigger the transmission data related to XR actions (e.g., sensing FoV) such that the anchor WTRU may perform measurements/evaluations on the data sent by other WTRU(s) which intend to join the collaborative group; in an example, the WTRU may request the other WTRUs to send the data by using certain parameters (e.g., start/stop time, time duration, pose orientation, configured pattern associated with different FoV sizes/resolution), which may be used for evaluating whether a node may be suitable to be included in a collaborative group.

When a WTRU may meet one or more conditions in certain configured criteria for supporting collaborative XR, the WTRU may send a response indication message (e.g., directly via sidelink to anchor WTRU and/or indirectly to network) for joining the collaborative group. In the case when the WTRU may not meet the one or more conditions in the criteria, the WTRU may either not send any response indication to the anchor WTRU or may send a response indication indicating the rejection for participating in collaborative XR, possibly including the rejection cause for rejecting the request from anchor WTRU.

The configured conditions/criteria (e.g., configured by the network via RRC and/or NAS signaling) used by WTRU for determining whether to send response indication message (e.g., to anchor WTRU) may include one or more of the following:

a. Matching of service IDs/XR action ID:

i. For example, a collaborative WTRU may send an indication when detecting that a service ID/XR action ID in the discovery/solicitation message received from an anchor WTRU matches/aligns with that of the service ID/XR action ID pre-configured/available in the collaborative WTRU.

b. Matching capability:

i. For example, the collaborative WTRU may send an indication when determining that the one or more capabilities (XR capability and/or connectivity capability) currently supported or is within the WTRU's capability to support matches/aligns with those indicated by the anchor WTRU in the discovery/solicitation message.

c. Positioning/pose criteria:

i. For example, the collaborative WTRU may send an indication when the relative/absolute location and/or the pose of the collaborative WTRU, meets certain positioning/pose criteria; in an example, the positioning/pose criteria used by the collaborative WTRU for deciding whether to send an indication to an anchor WTRU may include one or more of:

(1). Distance from the anchor WTRU is below a certain distance and/or within certain distance threshold values (e.g., within upper/lower bound distance threshold); and/or (2). Pose info of collaborative WTRU (e.g., expressed as a coordinate system describing dimensions of 6DoF or parameters/values describing 6 dimensions) is within one or more pose threshold values (e.g., upper/lower bound pose threshold), possibly indicated by the anchor WTRU.

d. Channel/load conditions (e.g., Uu and/or SL):

i. For example, the collaborative WTRU may send an indication when the quality/load of the channel used by the WTRU (e.g., for performing XR actions) meets certain measurement criteria such as the reference signal receive power (RSRP), reference signal receive quality (RSRQ), and/or reference signal strength indicator (RSSI) measurements of the channel (e.g., over Uu and/or SL interfaces) and/or channel busy ratio (CBR) of the channel (e.g., over SL interfaces) is above/below the respective threshold values and/or remains above/below the respective threshold value for a certain duration.

Following the reception of the response indication from one or more other WTRU(s), the (e.g., anchor) WTRU may select collaborative WTRU(s) that meet certain configured criteria, which may be similar to the criteria for the collaborative WTRUs for sending a response indication, described above. In addition, the (e.g., anchor) WTRU may select the best N collaborative WTRUs from the M WTRUs (e.g., where M>=N) which may meet the criteria, for example. In an example, the N collaborative WTRUs selected may be the WTRUs located within a distance range (e.g., upper and/or lower bound distance) from the anchor WTRU.

Upon selecting the one or more collaborative WTRUs for performing XR actions, the (e.g., anchor) WTRU may initiate a group formation procedure, including an authorization procedure (e.g., exchange of security keys), establishment of connections (e.g., RRC configuration for Uu links which may be associated with collaborative group and/or individual WTRUs, PC5-RRC configuration for sidelink interfaces between collaborative WTRUs and anchor WTRU, and/or forwarding configuration over Uu and SL), and triggering of XR actions, for example.

WTRU Sends Assistance/Status Info Associated with XR Actions to Network

In an embodiment, the WTRU may send information to the network, where the information may be associated with one or more XR actions performed by the WTRU. In an example, the WTRU may send the information associated with the XR actions for requesting the network to select one or more nodes/devices, possibly to be included in a collaborative group for performing the XR actions. In another example the WTRU may send the information for supporting application awareness features in the network, for example, for enabling the network to have awareness of the XR actions and/or application attributes/parameters supported by the WTRU.

The information may be sent by the WTRU to the network as any of the following: assistance information, status information/indication, and/or request/response messages, for example. The WTRU may send the information to the network via AS layer signaling (e.g., RRC signaling and/or messages, MAC control element (CE) or uplink control information (UCI)), Non-AS (NAS) layer signaling (e.g., PDU session related messages), or application layer signaling/messages, for example.

The information sent by the WTRU, for example, may include a combination of one or more of the following items labeled a-h:

Possible information sent by the WTRU, Item a:

a. Identifiers/IDs:

i. For example, the WTRU may send one or more IDs including any of the following: application/service/session ID, collaborative group ID (e.g., in which the WTRU may be associated with), IDs of other nodes/WTRUs, XR action ID (e.g., XR actions supported by the WTRU and/or requested to be performed by other WTRUs) and data type/message ID (e.g., ID associated with pose info, FoV info, media/video frame info).

Possible information sent by the WTRU, Item b:

b. Pose information (e.g., orientation, position/location)

i. For example, the pose info may be associated with the measurements in any spatial dimensions, including but not limited to longitude, latitude, altitude, roll, pitch, and yaw in one or more coordinate systems (e.g., cartesian, spherical). Thus, pose information includes location and orientation information. In one example, AR glasses (and/or a HMD) generally need to not only report their location (within reasonably high accuracy) to the network, but also report their orientation (pitch, yaw, roll angles) to determine not only where the AR or HMD device is located, but also in which direction/orientation the device is facing. and/or ii. In an example, the pose info sent by the WTRU may be associated with the orientation and/or position/location of the WTRU; in another example, the pose info sent by the WTRU may be the orientation and/or position/location of another WTRU/node/device, which may be desired and/or requested by the WTRU.

Possible information sent by the WTRU, Item c:

c. Capability information associated with connectivity:

i. For example, info on interfaces may include the number and/or types of interfaces (e.g., NR Uu, NR SL, WLAN, Bluetooth), supported by the WTRU; and/or ii. For example, the capability information on interfaces, possibly supported by the WTRU and/or required by the WTRU for supporting any of the XR actions in other WTRUs, may include any of the following: bandwidth, number of carriers, number of transmit antennas, number of receive antennas, etc.

Possible information sent by the WTRU, Item d:

d. Capability information associated with XR actions:

i. For example, the capability information related to XR actions, including visual sensing, possibly supported by the WTRU (e.g., sensors, camera associated with WTRU) and/or required by WTRU for supporting any of the XR actions in other WTRUs, may include any of the following: FoV resolution (e.g., megapixel count), aperture size, shutter lag and startup time, image quality (e.g., min/max range), zoom lens options, image stabilization, exposure settings, battery life, sound/audio, capability to merge overlapping frames from different angles, stitching frames from individual captures together for panoramic image/video).

Possible information sent by the WTRU, Item e:

e. Preferred forwarding configuration(s):

i. For example, the WTRU may send to the network and/or other WTRUs/nodes one or more preferred forwarding configurations for supporting any XR action, that may be performed/supported by a collaborative WTRU and/or another WTRU/node on behalf of the WTRU;

ii. For example, the forwarding configurations sent by the WTRU associated with the supported and/or requested user plane/control plane (UP/CP) configurations (e.g., radio bearers, logical channels, links) may include:

(1). Latency requirements:

(i). In an example, latency requirements may be expressed in terms of Packet Delay Budget (PDB) associated with IP packets/PDUs; and/or (ii). In an example, latency requirements may be expressed in terms of Application Delay Budget or Frame Delay Budget associated with frames (e.g., video/media frames).

(2). Data rate requirement (e.g., Mbps);

(3). Reliability requirements:

(i). In an example, reliability may be expressed in Packet Error Rate (PER); and/or (ii). In an example, reliability may be expressed in Frame Error Rate or Application Error rate. Application error rate may refer to the ratio of the number of received packets associated with an application data unit which may contain one or more errors and/or received after a delay budget/requirement to the total number of received packets associated with the application data unit, for example.

(4). Absolute/relative priority values associated with the UP/CP configurations (e.g., radio bearers, logical channels, links).

iii. In an example, the WTRU may send the first two or the first three or the first four preferred QoS configurations to provide options for the best selection of node to perform the XR action (e.g., FoV content capture, extended FoV content capture, etc.).

Possible information sent by the WTRU, Item f:

f. Information on selected node/WTRU for performing XR actions:

i. In an example, the WTRU, such as an anchor WTRU may select a node, such as a collaborative WTRU, based on WTRU pose information, dimension of WTRU FoV, dimension of WTRU extended FoV, pose information of candidate nodes, FoV of candidate nodes; the WTRU may send information (e.g., identifier/ID of node) to network on the selected node, for example; and/or ii. In an example, the WTRU may select a node with maximum alignment between dimensions of FoV or extended FoV of WTRU and dimensions of FoV of node. After selecting a node, the WTRU may send to the network the ID of the selected node and/or the XR action (e.g., perform mapping of FoV with certain parameters) associated with the selected node, for example. In an example, the WTRU may send explicit info on the selected node (e.g., node ID, XR action ID). In another example, the WTRU may send implicit info on selection of a node, including indication for requesting a preferred node(s) which may be located in proximity to the WTRU and/or indication of a radius from the WTRU's location and preference of any node within the radius.

Possible information sent by the WTRU, Item g:

g. Indication for activating node(s) and/or configurations associated with node(s):

i. For example, the WTRU may send an indication to the network to activate a node and/or a configuration associated with node (e.g., forwarding configuration), after performing node selection, where the request may include the node ID and/or XR action ID;

ii. In an example, the request to activate may be accompanied by details about the XR action (e.g., refreshed information on the FoV/extended FoV to be captured); and/or iii. In an example, the indication to activate may be accompanied by a request for validation that the selected node(s) are valid, due to one or more conditions which may be included in the indication sent by WTRU to network:

(1). For example, if a gNB is aware that node 1 may be in idle mode, the WTRU may delegate to the network for determining another node that may perform the requested XR action;

(2). For example, if a gNB is aware that node 1 may be experiencing link degradation, the WTRU may delegate to the network for determining another node that may perform the requested XR action; and/or (3). For example, if a gNB is aware that node 1 may be experiencing an overloading condition (e.g., serving other WTRUs), the WTRU may delegate to the network for determining another node that may perform the requested XR action.

Possible information sent by the WTRU, Item h:

h. Indication for deactivating node(s) and/or configurations associated with node(s):

i. For example, the WTRU may send an indication to the network for deactivating a node and/or a configuration associated with the node (e.g., forwarding configuration), when a node may no longer serve the WTRU and/or perform an XR action requested by the WTRU. In this case, the WTRU may send the indication to stop or halt an XR action (e.g., FoV capture) and/or to not start an XR action if it is not ongoing; and/or ii. In an example, the indication to deactivate may be sent due to one or more of conditions:

(1). For example, when the FoV of WTRU changes (e.g., FoV direction is above/below an FoV direction threshold and/or size of FoV is above/below a FoV size threshold, due to WTRU movement) and a previously selected node may no longer have maximum alignment between its FoV and dimension of WTRU FoV or dimension of WTRU extended FoV.

The WTRU may send to the network the information, possibly associated with XR actions and/or collaborative group, based on one or more of the following triggering events:

a. During connectivity/session establishment and/or (re) configuration:

i. For example, during RRC connection, PDU session, application session establishment and/or (re)configuration;

b. When changing/updating XR actions:

i. For example, when starting new XR actions, updating XR actions, and/or releasing XR actions;

c. When receiving higher layer/application information:

i. For example, when receiving an indication (e.g., from application function hosted in WTRU or in network) indicating change in XR actions, forwarding configurations, etc.;

d. When detecting change in measurements and movements:

i. For example, when the RSRP, RSRQ, RSSI measurements of the signals, channels, radio links, carriers, etc., possibly associated with the one or more XR actions, are above/below threshold values; and/or ii. For example, when pose/positioning measurements (e.g., location information, pose in 6DoF) are above/below pose threshold values;

e. When detecting change in time/timing attributes:

i. For example, the WTRU may send information periodically or when a timer associated with sending of assistance information is set and/or expires.

WTRU Receives Configuration/Assistance Info for Performing XR Actions and/or Creating/Updating Collaborative Group In an embodiment, the WTRU may receive information from the network to assist the WTRU in selecting a suitable node for performing one or more XR actions and/or establishing/updating a collaborative group. The information that may be received by the WTRU from the network may be in the form of assistance information and/or status information/indication, for example. In another example, the information (e.g., assistance information, configuration information), may be received from another node/WTRU, directly (e.g., via a sidelink interface) or indirectly (e.g., via network). The WTRU may receive the information from the network via AS layer signaling (e.g., RRC signaling and/or messages, MAC CE or downlink control information (DCI), Non-AS (NAS) layer signaling (PDU session related messages), or application layer signaling/messages, for example.

The information (e.g., assistance information, configuration information) which may be received by the WTRU from the network, for example, may include a combination of one or more of the following items labeled a-m:

Possible information received by the WTRU, Item a:

a. Pose information of node(s):

i. For example, the pose info may be associated with measurements in any spatial dimensions (e.g., in 6DoF), possibly in one or more coordinate systems (e.g., cartesian, spherical); and/or ii. For example, the pose information may be associated with the pose of candidate nodes available for selection, for performing an XR action and/or to be included in a collaborative group;

Possible information received by the WTRU, Item b:

b. FoV information of node(s):

i. For example, FoV information may correspond to the dimensions of FoV (e.g., perimeter/border/size/boundaries/angle width of FoV), which may be expressed in terms of measurements in any spatial dimensions, in one or more coordinate systems (e.g., cartesian, spherical);

ii. For example, the FoV size/dimensions may be associated with the FoV of candidate nodes available for selection, for performing an XR action, and/or included in a collaborative group;

iii. In an example, the WTRU may receive information on the FoV of its own sensors/camera (e.g., co-located with WTRU) and/or the extended FoV dimensions achievable when including one or more nodes in a collaborative group when performing XR actions. The information on FoV, including extended FoV, received by the WTRU may include the dimensions, time duration when the indicated FoV may be valid and area (e.g., list of cells IDs, list of cell sector IDs, list of directions within a cell) where the indicated FoV information may be valid;

Possible information received by the WTRU, Item c:

c. Configuration information associated with nodes:

i. Node ID (e.g., Node ID may correspond to the AS-layer ID (e.g., C-RNTI), NAS-layer ID; or application layer ID);

ii. Forwarding configurations on Uu link and/or SL (e.g., nodes may have one or more forwarding configurations (e.g., radio bearers/logical channels (LCHs)) for the QoS supported over UP/CP, which may correspond to one or more absolute/relative priority values (e.g., associated with different links/radio bearers/LCHs), data rates values, latency values (e.g., PDB), reliability values (e.g., PER) achievable/expected, during data transmission);

iii. For example, the configuration information may be associated with the forwarding config of candidate nodes available for selection, for performing an XR action, and/or included in a collaborative group;

Possible information received by the WTRU, Item d:

d. Control signalling associated with nodes:

i. In an example, the WTRU may receive control signalling (e.g., activation/deactivation messages, acknowledgement message) from the network indicating whether a node may be selected for a collaborative group and/or may perform an XR action, possibly requested by a WTRU;

Possible information received by the WTRU, Item e:

e. Validity status of nodes, indicating whether a node may be considered as valid or invalid, based on one or more of the following conditions/states:

i. RRC state of node (e.g., network may have knowledge of RRC state of nodes and expected duration of node may be the RRC state, and the WTRU receives the RRC state info of nodes); for example, the WTRU may receive info on the time instance when a node may transition to/from a first RRC state to a second RRC state, and/or the expected time duration for a node to remain in an RRC state (e.g., CONNECTED, INACTIVE, IDLE);

Possible information received by the WTRU, Item f:

f. Pose difference threshold value:

i. For example, the pose difference threshold value may correspond to the difference between the measurement of pose info at a first time instance and a second time instance, where the time instances may correspond to any of the following units: time slots, symbol duration, system frame number (SFN); and seconds/milliseconds;

ii. For example, the pose difference threshold may be used by the WTRU for determining whether to select and/or re-select a node for performing an XR action;

iii. For example, the pose difference threshold value may be determined and indicated by the NW or by the application to the WTRU or may be used by the NW in cases where the NW does the selection of nodes/WTRUs for the XR action;

iv. For example, the pose difference threshold value may be associated with a node/WTRU, or it may be associated with a collection of nodes/WTRUs;

v. For example, the pose difference threshold value may be specific to an XR application (e.g., for an XR application which is very sensitive to WTRU movement, the WTRU movement threshold may be configured to be at a lower value than that for an XR application which may be less sensitive to WTRU movement).

Possible information received by the WTRU, Item g:

g. WTRU movement threshold value:

i. For example, the WTRU movement threshold may correspond to the difference between the location of a WTRU between a first time instance and a second time instance, where the time instances may correspond to any of the following units: time slots, symbol duration, SFN and seconds/milliseconds; the WTRU movement threshold may be configured or provided to the WTRU by the network or application function;

ii. For example, the WTRU movement threshold may be used by the WTRU for determining whether to send an indication to the network (e.g., indicating change in WTRU location/movement) and/or to (re)select a node for performing an XR action; and/or iii. In an example, the WTRU movement threshold may be specific to an XR application (e.g., for an XR application which is very sensitive to WTRU movement, the WTRU movement threshold may be configured to be at a lower value than that for an XR application which may be less sensitive to WTRU movement).

Possible information received by the WTRU, Item h:

h. Correlation time window:

i. For example, the correlation time window may correspond to the minimum time difference between two events (e.g., pose info measurements, FoV measurements), where the two events may be considered as correlated between one and another when they occur within the correlation time window; when the two events occur at time instances beyond the correlation time window, they may be considered as independent; and/or ii. In an example, the WTRU may use the correlation time window for determining whether to send an indication to the network indicating change in WTRU location/movement) and/or to (re)select a node for performing an XR action; and/or Possible information received by the WTRU, Item j:

j. Spatial alignment threshold value:

i. For example, the spatial alignment value may correspond to the combined dimensions of the FoV (e.g., over x, y, z axes) formed as a result of combining the dimensions of FoV of WTRU and the dimensions of FoV of a node, where the combined dimensions of FoV may overlap and/or be contained within the space formed by the dimensions of extended FoV; and/or ii. In an example, the WTRU may select a node such that the spatial alignment value achieved, by selecting and using a node (e.g., for sensing FoV), is above a spatial alignment threshold value.

Possible information received by the WTRU, Item k:

k. Maximum number of WTRUs that can be part of the WTRU group:

i. There may be a maximum number of WTRUs that may be allowed to form part of a collaborative WTRU group, restricting the number of WTRUs that the anchor WTRU can solicitate to join its WTRU group.

ii. The maximum number of WTRUs may be configured by the network (NW) as a way to exercise control over the number of WTRUs that may use resources to the benefit of the anchor WTRU, to prevent the anchor WTRU from acting in a 'greedy' way and have a very large WTRU group with multiple WTRUs 'working' on behalf of the anchor WTRU (in terms of capturing and sending sensing data to the network or directly to the anchor WTRU).

iii. Establishing a limit to the maximum number of WTRUs that may form part of a WTRU group benefits the NW/gNB in that a large amount of resources for multiple WTRUs does not need to be earmarked/reserved for the benefit of the anchor WTRU.

iv. Establishing a limit to the maximum number of WTRUs that may form the WTRU group, potentially formed by the anchor WTRU, allows the gNB to plan ahead of time its scheduling assignments. In an example, setting a limit of 3 WTRUs to form part of a WTRU group following an initial request for candidate WTRUs from an anchor WTRU may implicitly indicate to the gNB that it will shortly (e.g., in the next one or more cycles) provide resources to 3 XR-capable WTRUs in proximity to the anchor WTRU. As a result, the gNB may deny the request for candidate WTRUs from another anchor WTRU in proximity or the gNB may further restrict the maximum number of WTRUs that may form part of the other anchor WTRU's WTRU group (e.g., by setting a limit of 2 WTRUs for the other anchor WTRU's WTRU group).

v. The maximum number of WTRUs may be 2, 3, 4, . . . , N, for example.

vi. The maximum number may be determined by the NW/gNB, for example.

vii. The maximum number of WTRUs allowed in a group may be gNB-specific/cell-specific, i.e., the max number may change depending on the type of cell (e.g., macro cell or small cell (femtocell, pico-cell, microcell etc.)) in that different types of cell may be able to accommodate a different number of WTRUs to service the needs of the anchor WTRU.

viii. The maximum number of WTRUs established by the gNB may be a function of the loading at the gNB at that particular period of time.

ix. The maximum number of WTRUs established by the gNB may be a function of the location of the gNB, e.g., a gNB in a remote area may be able to accommodate a larger number of WTRUs per WTRU group than a gNB in an urban area.

x. The maximum number of WTRUs established by the gNB may be a function of the ease of handover, i.e., how easily the source gNB may be able to handover the request of one or more WTRUs in the cell it is currently serving to another target gNB.

xi. The maximum number of WTRUs that the anchor WTRU desires to form part of its group may be indicated by the anchor WTRU to the gNB (e.g., in UCI). It may be up to the gNB to accommodate the anchor WTRU or set a lower maximum number than the maximum number requested by the anchor WTRU.

xii. The maximum number of WTRUs may be determined by the gNB based on past behavior from the WTRU. In an example, if a gNB is aware of tendencies of particular WTRUs to request for high number of WTRUs to be part of their group to benefit the requirements of their respective XR application at the expense of 'hogging resources' for the purpose of other WTRUs, the gNB may be inclined to set a more limited maximum number of WTRUs for that anchor WTRU. In another example, if the amount of resources that the gNB anticipates from potential WTRU members based on the maximum number it set for an anchor WTRU in proximity is consistently lower than the amount of resources requested by the member WTRUs of that group, the gNB may adjust the maximum number of WTRUs to a lower number for subsequent requests by that anchor WTRU.

Possible information received by the WTRU, Item m:

m. Minimum number of WTRU(s) that can be part of the WTRU group i. In an example, the gNB may also set a minimum number of WTRUs that can form part of the WTRU group, to justify the additional signalling overhead of forming a WTRU group.

WTRU Sends to the Network (NW) Information that Allow the NW to Assist the WTRU in the Selection of WTRUs to Form the Collaborative WTRU Group In an embodiment, an anchor WTRU may send assistance information to the NW such that the NW may make a first selection of candidate collaborative WTRUs to send to the anchor WTRU. Features of the anchor WTRU to accommodate this function may be one or more of the following items labeled as a-g:

Possible features of the anchor WTRU, Item a:

a. The anchor WTRU may send to the NW a request for candidate collaborative WTRUs for the NW to provide the WTRU with candidate WTRUs to form part of the group.

Possible features of the anchor WTRU, Item b:

b. The request for candidate collaborative WTRUs may be accompanied by the pose information of the anchor WTRU (i.e., location, orientation, any positioning data) that may assist the NW in providing a set of suitable candidate WTRUs to form part of the WTRU group, based on pose information of the candidate WTRUs.

Possible features of the anchor WTRU, Item c:

c. The request for candidate collaborative WTRUs may be accompanied by metadata about the sensing data required by the anchor WTRU (e.g., FoV or extended FoV dimensions of the anchor WTRU) that may assist the NW in providing a set of suitable candidate WTRUs to form part of the WTRU group based on sensing data of the candidate WTRUs.

Possible features of the anchor WTRU, Item d:

d. The collaborative WTRU may send to the NW a request to join the WTRU group of an anchor (i.e., to be a candidate collaborative WTRU). The request may be associated with the WTRU group of a specific anchor WTRU or it may be a general request to join any WTRU group. The request may be accompanied by the pose information of the collaborative WTRU (i.e., location, orientation, any positioning data) and/or sensing metadata (e.g., FoV and/or extended FoV dimensions) that may assist the NW in finding a suitable WTRU group for the collaborative WTRU.

Possible features of the anchor WTRU, Item e:

e. The request for candidate collaborative WTRUs may be accompanied by one or more thresholds determined/configured by the anchor WTRU to assist the NW in selecting suitable candidate WTRUs to form part of the WTRU group. Those thresholds may include one or more of the following:

i. Distance thresholds (1). Minimum distance threshold—The minimum distance threshold may indicate a minimum distance/lower bound from the location/position of the anchor WTRU. In this instance, overlap of distance between the anchor WTRU and a collaborative WTRU is desirable. In an example, any candidate WTRU would have to be within the minimum distance threshold to be considered as a candidate for the WTRU group. In an example, the anchor WTRU may determine that the sensing data of any WTRU not within (or greater than) the minimum distance threshold of the anchor WTRU may not be relevant for the WTRU to form part of the WTRU group.

(2). Maximum distance threshold—The maximum distance threshold may indicate a maximum distance/upper bound from the location/position of the anchor WTRU. In this instance, overlap of distance between the anchor WTRU and a collaborative WTRU is not desirable. In an example, any candidate WTRU outside of the maximum distance threshold may be considered as a candidate for the WTRU group. In an example, the anchor WTRU may determine that the sensing data of any WTRU not outside of the maximum distance threshold of the anchor WTRU may be too similar to the sensing data of the anchor WTRU and redundant, hence negating any need for that WTRU to join the WTRU group.

ii. Orientation thresholds (1). Minimum orientation threshold—The minimum orientation (i.e., direction, angular range) threshold may indicate a minimum orientation/lower bound from the orientation of the anchor WTRU. In this instance, overlap of orientation between the anchor WTRU and a collaborative WTRU is desirable. In an example, any candidate WTRU would have to exceed the minimum orientation threshold of the anchor WTRU to be considered as a candidate for the WTRU group. In an example, the anchor WTRU may determine that the sensing data of any WTRU not within (or less than) the minimum orientation threshold of the anchor WTRU may have little (not enough) overlap with the sensing of the anchor WTRU and hence be irrelevant to the anchor WTRU.

(2). Maximum orientation threshold—The maximum orientation threshold may indicate a maximum orientation/upper bound from the orientation of the anchor WTRU. In this instance, overlap of orientation between the anchor WTRU and a collaborative WTRU is not desirable. In an example, any candidate WTRU outside of (in excess of) the maximum orientation threshold may be considered as a candidate for the WTRU group. In an example, the anchor WTRU may determine that the sensing data of any WTRU that is greater than the maximum orientation threshold of the anchor WTRU may be too similar to the sensing data of the anchor WTRU and redundant, hence negating any need for that WTRU to join the WTRU group.

iii. Sensing data thresholds (1). There may be parameters defined to characterize sensing data, e.g., FoV or extended FoV and/or their dimensions. There may be standardized methods to describe them (e.g., in terms of depth, resolution, pixels, etc.)

(2). WTRUs may send metadata on their sensing data to the gNB.

(3). The anchor WTRU may define/set some thresholds based on the sensing data that it wants and sends them to the gNB to assist the gNB in selecting suitable candidate WTRUs for the WTRU group. In an example, the anchor WTRU may send a resolution threshold of X pixels per inch such that any potential candidate member WTRU would need to capture sensing data at a minimum resolution threshold of X pixels per inch to form part of its collaborative WTRU group.

Possible features of the anchor WTRU, Item f:

f. The anchor WTRU may send to the gNB an indication on the selected collaborative WTRUs. This information may assist the gNB in scheduling purposes.

Possible features of the anchor WTRU, Item g:

g. The collaborative WTRU may send to the gNB a confirmation indicating that it has joined a collaborative WTRU group.

WTRU Selects a Suitable Node to Perform an XR Action

In an embodiment, the WTRU may select one or more nodes for performing an XR action (e.g., sensing an extended FoV), based on assistance/configuration information received from a network/application, including pose of WTRU, pose of candidate nodes, field of view (FoV) dimensions of WTRU/nodes, and spatial alignment threshold value, such that the selection of the node may achieve a certain spatial alignment associated with extended FoV.

The WTRU may select a first node from a set of candidate nodes that may result in achieving a first spatial alignment value between dimensions of FoV of WTRU, dimensions of FoV of candidate nodes, and the dimensions of extended FoV. In this case, the WTRU may select a node such that the first spatial alignment value achieved with the selected first node is above the spatial alignment threshold value.

In the case when detecting one or more triggering events (e.g., including WTRU movement, change of WTRU pose, and/or change of pose of first node), the WTRU may determine a second spatial alignment value using the updated info associated with an updated pose of WTRU and/or an updated pose of the first node, for example. When the determined second spatial alignment value is less than the spatial alignment threshold value, the WTRU may perform one or more of the following:

a. the WTRU may send an indication to the network, possibly containing a request for a new candidate set comprising one or more nodes; the request may include updated info associated with candidate nodes, including any of pose info, dimensions of FoV and forwarding configuration;

b. the WTRU may send updated WTRU pose info to the network; and/or c. the WTRU may initiate a discovery procedure by sending discovery/solicitation messages (e.g., via sidelink) for determining candidate nodes.

WTRU Sends Measurement Info to Network Based on Configured Parameters Associated with WTRU Movement In an embodiment, a WTRU may send the measurement info (e.g., pose measurements) to the network when detecting a change in WTRU pose/movement with respect to one or more threshold values received by the WTRU as configuration information. In an example, the WTRU may receive from the network the pose difference threshold and a correlation time window as configuration information. The WTRU may also receive, from the network/application, one or more conditions/criteria associated with WTRU actions when detecting the threshold values.

The WTRU, which may have received the threshold parameters and/or conditions from the network, may perform one or more of the following actions when measuring/determining the pose info based on the following conditions:

a. When pose info (e.g., at time instant t2)–pose (e.g., at time instant t1) is less than a pose difference threshold and/or the time difference t2–t1 is less than or equal to a correlation time window:
    i. the WTRU may send pose info measured at t2 and/or t1 to the network (e.g., gNB)
    ii. the WTRU may send an indication and/or flag, possibly indicating the measurements are within the threshold parameters, for example; in another example, the WTRU may not send any info to the network;

b. When pose info (e.g., at t2)–pose (e.g., at t1) is less than a pose difference threshold and/or the time difference t2–t1 is greater than or equal to a correlation time window:
    i. the WTRU may send pose info measured at t2 and/or t1 to the network (e.g., gNB); and/or
    ii. The WTRU may send an indication and/or flag/ID, possibly indicating triggering of the correlation time window (e.g., time difference is greater than correlation time window); for example, such a condition may correspond to periodic transmission of pose info;
c. When pose info (e.g., at t2)–pose (e.g., at t1) is greater than a pose difference threshold and/or the time difference t2–t1 is less than or equal to a correlation time window:
   i. the WTRU may send any of the following to the network: pose info measured at t1, pose info measured at t2, measured correlation time (e.g., any of t1, t2, and t2-t1), and/or indication to update the correlation time window; and/or
d. When pose info (e.g., at t2)–pose info (e.g., at t1) is greater than or equal to a pose difference threshold and/or t2–t1 is greater than or equal to a correlation time window,
   i. the WTRU may send any of the following to the network: pose info measured at t1, pose info measured at t2, and/or measured correlation time (e.g., any of t1, t2, and t2-t1).

In the scenarios where the measured time difference (e.g., t2–t1) is different than the correlation time window received from the network, the WTRU may use the measured time difference as the new correlation time window, for determining whether to send the pose info to the network. The WTRU may send the measurement info to the network via AS layer signaling (e.g., RRC signaling and/or messages, MAC CE or UCI), Non-AS (NAS) layer signaling (e.g., PDU session related messages), or application layer signaling/messages, for example.

The WTRU may change from using the first correlation time (e.g., received from the network) to the second correlation time (e.g., measured time difference), possibly after sending the info on the measured time difference to the network and/or receiving an indication from the network, such as an acknowledgement message for changing/updating to a new correlation time window. In another example, the WTRU may use a second correlation time window, where the second correlation time window may correspond to an updated correlation time window received from the network.

WTRU Sends Pose Info to Network Based on Time-Based Parameters

In an embodiment, a WTRU may determine its pose information and/or send indications/reports to the network, containing the pose info, using time-based/temporal configurations (e.g., periodic, aperiodic, or semi-persistent). The time-based configurations, including the parameters and/or triggers, may be received by the WTRU from the network/application, possibly as configuration information. The WTRU may send the pose info to the network via AS layer signaling (e.g., RRC signaling and/or messages, MAC CE, or UCI), Non-AS (NAS) layer signaling (e.g., PDU session related messages), and/or application layer signaling/messages, for example.

The time-based configurations, which may be used by the WTRU for sending pose info and/or other indications/reports to the network, may include one or more of the following:
a. Configuration for periodic transmission/reporting:
   i. For example, configuration for periodic transmission may include start time (e.g., start slot, start slot offset), periodicity, time duration, stop time (e.g., stop slot, stop slot offset); and/or
   ii. For example, the WTRU may receive configuration associated with a set of periodicities; the WTRU may select a periodicity, from a set of periodicities to use for sending pose info/reports, based on parameters associated with the distance between WTRU and a collaborative WTRU/node:
   1. For example, if the distance between the WTRU and a collaborative WTRU/node is above a threshold, the WTRU may select a periodicity value that results in measuring the pose and sending pose info/reports more frequently (e.g., WTRU may select a smaller periodicity value, where the selected periodicity may be proportional to the inter-WTRU distance); this may result in the WTRU sending more accurate pose info and allow for determining a more suitable node for performing any of the XR actions.
b. Configuration for aperiodic transmission/reporting (e.g., event triggered):
   i. For example, the WTRU may send the pose info/reports when detecting one or more triggering events (e.g., WTRU movement, pose changes, FoV changes, and/or changes in XR actions);
c. Configuration for semi-persistent transmission/reporting:
   i. For example, configuration for semi-persistent transmission may include start time (e.g., start slot, start slot offset), periodicity, time duration, stop time (e.g., stop slot, stop slot offset); the configuration for semi-persistent transmission may also include activation/deactivation of transmission/reporting based on reception of an activation/deactivation indication from network (e.g., in RRC signalling, MAC CE, DCI);
   ii. In an example, after receiving an activation indication, the WTRU may perform transmission and/or send reports using the configuration for semi-persistent transmission until an explicit deactivation indication may be received from network; and/or
   iii. In another example, the WTRU may be preconfigured with one or more validity conditions, including area validity conditions (e.g., list of cells/sectors/directions) and/or time validity conditions (e.g., timing advance/alignment/synchronization timer) where the configuration for semi-persistent transmission may be considered to be valid for usage; in this case, for example, the WTRU may activate/deactivate the transmission/reporting using the configuration for semi-persistent transmission when detecting implicit triggers associated with the validity conditions (e.g., WTRU starts transmission when entering into a cell and/or stops transmission when leaving a cell).

In an embodiment, the WTRU may be configured to perform N pose measurements, possibly over a configured time duration T, determine the average of the values from the different pose measurements, and use the average pose value when sending the pose info/reports to network.

Figure 3A:
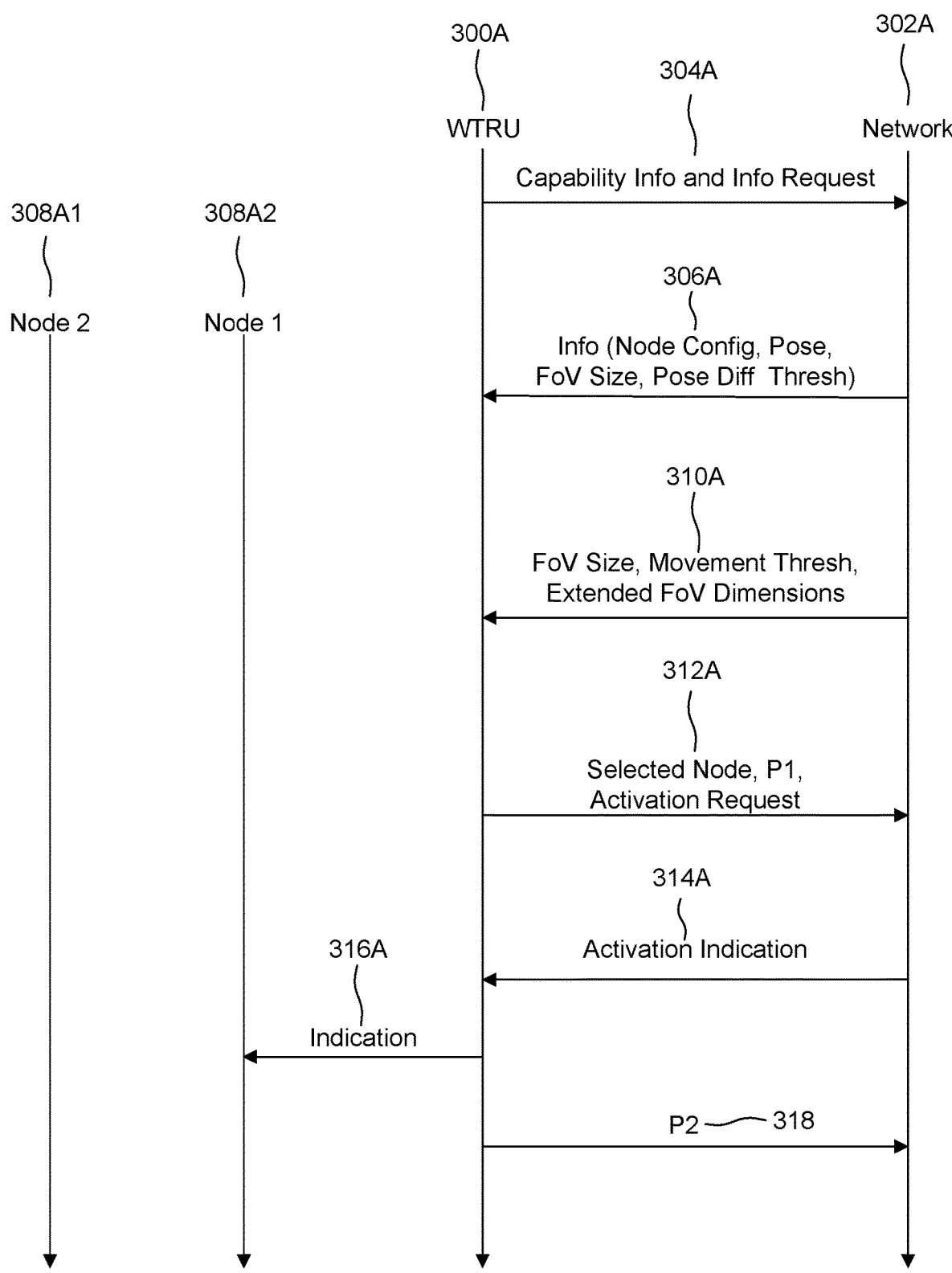
FIG. 3A is a signaling diagram depicting WTRU operation according to embodiments of a method of supporting device group for collaborative extended reality (XR)
Figure 3B:
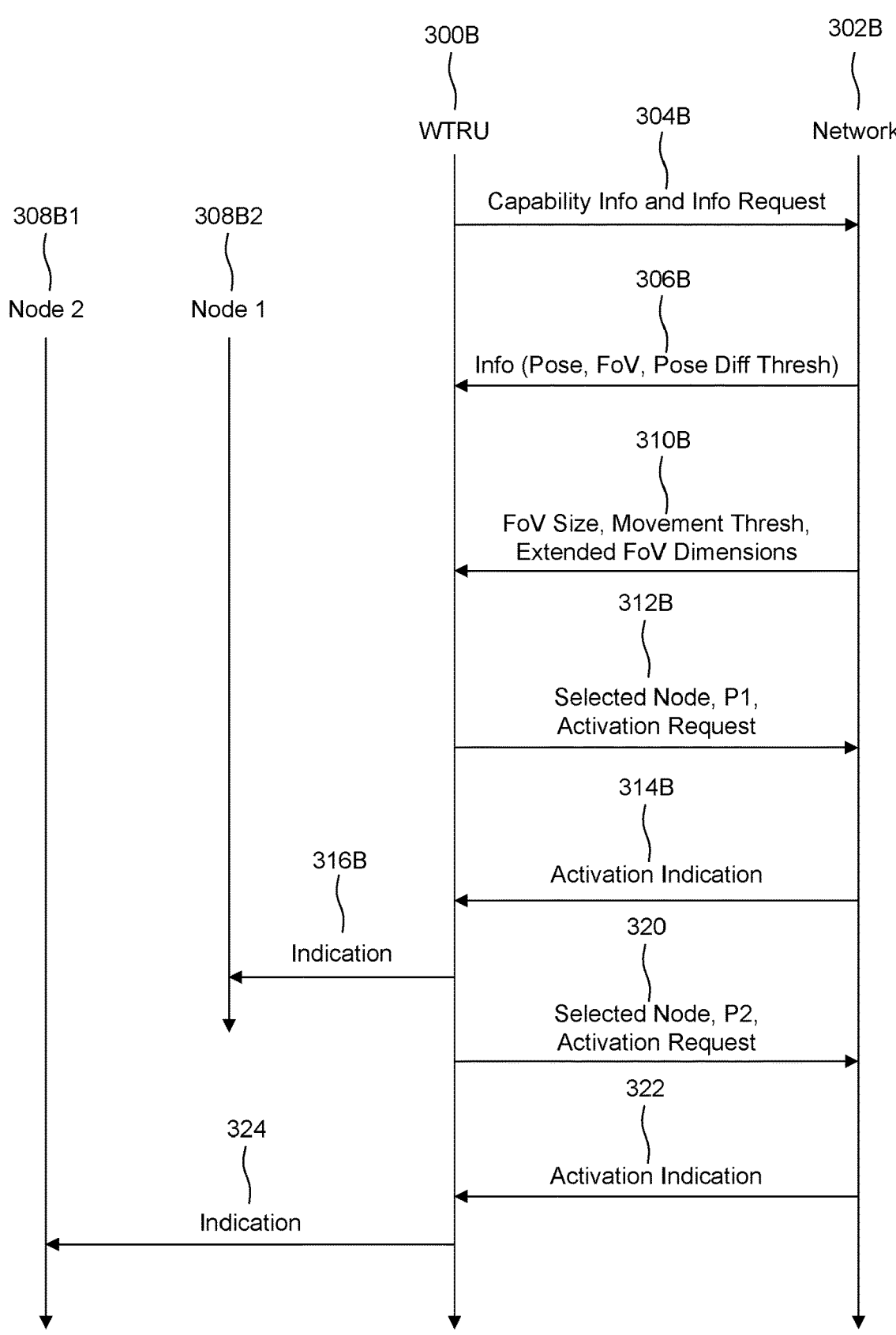
FIG. 3B is a signaling diagram depicting WTRU operation according to embodiments of a method of supporting device group for collaborative extended reality (XR).

Example Embodiment: WTRU Selects a Node for Performing an XR Action Based on Assistance Information Received from Network In an embodiment, a WTRU may send to the network its location and capability information and request the network assistance information for selecting a node for performing an XR action. The WTRU performs the selection of a suitable node based on the assistance information received from network for performing the XR action. For example, the WTRU may select a node that results in achieving a maximum alignment between dimensions of WTRU FoV or dimensions of extended WTRU FoV and dimensions of node FoV. In an example, this alignment could imply the largest intersecting area of the environment to be mapped, between FoV of node and (e.g., extended) FoV of WTRU. FIGS. 3A and 3B show example steps that may be involved in the embodiment:

a. At 304A and 304B, a WTRU 300A and 300B sends to the network 302A and 302B, its location information and its capabilities and requests information about other devices (e.g., nodes) in proximity with similar capabilities to WTRU;

b. At 306A and 306B, WTRU 300A and 300B receives, from NW 302A and 302B, info from one or more candidate nodes 308A1, 308A2, 308B1, and 308B2, including config of nodes (e.g., IDs, QoS config on Uu), pose info of candidate node, FoV metadata (e.g., size, dimension, quality, etc.) of each candidate node and, pose difference threshold; for example, the WTRU may receive the information associated with one or more candidate nodes 308A1, 308A2, 308B1, and 308B2, in a single-shot message or in periodic messages received periodically. The periodic messages may be received by the WTRU 300A and 300B from the NW 302A and 302B using a certain configured periodicity, where the periodic messages may contain a refreshed/updated list of one or more candidate nodes 308A1, 308A2, 308B1, and 308B2 and/or updated information associated with one or more candidate nodes 308A1, 308A2, 308B1, and 308B2, for example. The WTRU 300A and 300B may use the latest or last received information associated with one or more candidate nodes 308A1, 308A2, 308B1, and 308B2 when performing selection of a suitable node, for example.

c. At 310A, WTRU 300A and 300B receives, from application/network 302A and 302B, WTRU FoV metadata (e.g., size, dimension, quality, etc. of WTRU FoV), WTRU movement threshold, and WTRU extended FoV metadata (e.g., size, dimension, quality, etc. of WTRU extended FoV) (e.g., for immersive XR);

d. WTRU 300A and 300B determines its first pose info (e.g., pose info p1);

e. WTRU 300A and 300B selects a first node 308A2 and 308B2 (e.g., node 1) based on p1, WTRU FoV metadata (e.g., size, dimension, quality, etc.), WTRU extended FoV metadata (e.g., size, dimension, quality, etc.) and pose info of candidate nodes:
   i. For example, WTRU 300A and 300B selects the node 308A2 and 308B2 with maximum alignment between dimensions of extended FoV of the WTRU and dimensions of FoV of the selected node;

f. At 312A and 312B, WTRU 300A and 300B sends an indication to network 302A and 302B: the info on selected node 1, p1, and request to activate config of node 1;

g. At 314A and 314B, WTRU 300A and 300B receives an activation indication from network 302A and 302B;

h. At 316A and 316B, WTRU 300A and 300B sends an indication to node 1 308A2 and 308B2 (e.g., for initiating FoV capture) using config of node 1.

j. If WTRU movement>WTRU movement threshold;
   i. WTRU 300A and 300B determines updated pose info, (e.g., pose info 2, p2):
      (1). If p2−p1<pose difference threshold:
         At 318, WTRU 300A sends p2 to network 302A;
      (2). If p2−p1>pose difference threshold:
         (i). WTRU 300B selects second node 308B1 (e.g., node 2), from candidate nodes, based on p2 and other parameters;

(ii). At 320, WTRU 300B sends indication to network 302B, info on selected node 2 308B1, p2 and request to activate config of node 2 and deactivate node 1 308B2; and (iii). At 324, WTRU 300B sends an indication to node 2 308B1 (e.g., for initiating FoV capture) using config of node 2, after receiving activation indication from network 302B at 322.

Figure 4:
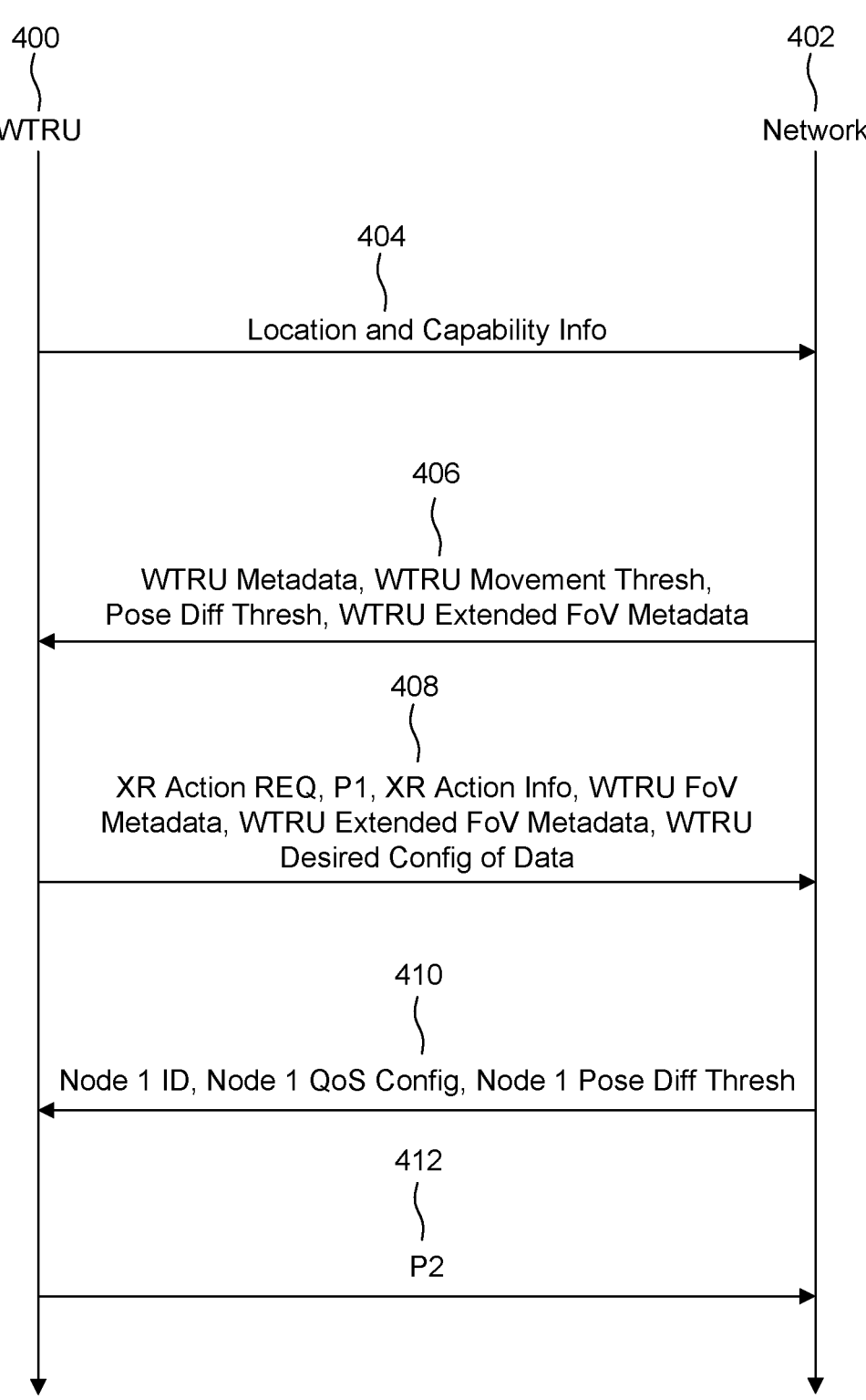
FIG. 4 is a signaling diagram depicting WTRU operation according to embodiments of a method of supporting device group for collaborative extended reality (XR).

Example Embodiment: WTRU Assists the Network for Selecting a Node for Performing an XR Action In an embodiment, the WTRU may assist the network for selecting a suitable node for performing an XR action (e.g., perform FoV content capture). The WTRU may send to the network the assistance information that may be used for performing the node selection. The assistance information may include dimensions of WTRU FoV, dimensions of extended WTRU FoV, WTRU pose information, WTRU desired QoS configuration (e.g., preferred data rates, latency, reliability for XR action) and/or data destination (e.g., server ID). FIG. 4 shows example steps that may be involved in the embodiment:

a. At 404, WTRU 400 sends to network 402 its location information and capability information;

b. At 406, the WTRU 400 receives, from application/NW 402, WTRU FoV metadata (e.g., size, dimension, quality, etc. of WTRU FoV), WTRU movement threshold, pose difference threshold, and WTRU extended FoV metadata (e.g., size, dimension, quality, etc. of WTRU extended FoV);

c. WTRU 400 determines its first pose info (e.g., pose info p1);

d. At 408, WTRU 400 sends to network 402 the following info: request for a node to perform an XR action, $p_1$, info on XR action (e.g., perform FoV content capture, action ID), WTRU FoV metadata (e.g., size, dimension, quality, etc. of WTRU FoV), WTRU extended FoV metadata (e.g., size, dimension, quality, etc. of WTRU extended FoV) and WTRU desired configuration of data (e.g., WTRU preferred QoS config on Uu, ID of application server);

e. At 410, WTRU 400 receives a notification from network 402 about the node ID that is able to perform the XR action (e.g., node 1 to perform FoV content capture), along with the QoS config of node 1 selected by network 402. WTRU 400 may also receive a pose difference threshold specific to node 1; and f. If WTRU 400 movement>WTRU movement threshold:
   i. WTRU 400 determines its updated pose info, $p_2$ and, at 412, sends it back to network 402.

Example Embodiment: WTRU Receives Indication from Network Indicating Selection for Performing an XR Action In an embodiment, the selection of nodes is described from the selected node's perspective (e.g., a non-anchor WTRU). The selected node may be a WTRU, a WTRU controlled by a network operator, a stationary WTRU or mobile WTRU, with visual/sensing components. In an embodiment, the node may also operate as a base station, with limited or full capability in terms of functionality.

The difference between the anchor WTRU and the selected node lies in the following functional aspects: the selected node may send and receive information to assist in selection of WTRU(s)/node(s) for XR action; and/or the selected node may send ACK messages to confirm it may perform an XR action, or NACK messages to decline/reject a request to perform an XR action when the node may be unavailable to perform the XR action, for example. The request for performing an XR action may be received by the selected node from the WTRU and/or network in an event triggered message (e.g., during initial node selection, or when changes in pose are detected at the WTRU) or in periodic messages (e.g., in request confirmation messages received periodically with certain configured periodicity for requesting to confirm whether the XR action may be continued to be performed by the selected node). In an example, a selected node may be overloaded while servicing other WTRUs such that the selected node has no more bandwidth/resources available to perform an XR action. In this scenario, the selected node may send a NACK message to respond to a request (e.g., from either a WTRU or the network) to perform an XR action:

a. In an example, the selected node may experience a degradation in link quality and may determine that it is not able to perform an XR action within the QoS requirements (e.g., latency, bitrates, reliability, etc.). In this scenario, a selected node may send a NACK message to respond to a request (e.g., from either a WTRU or the network) to perform an XR action;

b. In an example, where a selected node may detect and assess that there has been an obstacle in its FoV content, such that the selected node no longer has the FoV content/extended FoV content that may be required by the XR action, the selected node may assess that it is no longer able to perform an XR action; in this scenario, the node may send a NACK message to respond to a request (e.g., from either WTRU or network) to perform the XR action;

c. In an example where a node may not be stationary and the node's movement is deterministic (i.e., the selected node has knowledge of its movement trajectory), and the selected node's movement may be taking it further away from an anchor WTRU, the selected node may decide that it is not able to carry out an XR action; in this scenario, the selected node may send a NACK message to respond to a request (e.g., from either a WTRU or the network) to perform an XR action;

d. In another example, the selected node may autonomously send a NACK message, possibly even when not receiving a request from a WTRU or network, due to any of the following: when detecting that it no longer has the FoV content/extended FoV metadata of content that may be required by an XR action; when detecting link degradation (e.g., RSRP measurement of a channel associated with the link is below an RSRP threshold), when detecting node movement; and when assessing that it is no longer able to perform an XR action; and/or e. In all scenarios where a selected node may be unable to perform an XR action, the selected node may suggest/recommend another neighboring node who may be able to perform the XR action.

Figure 5A:
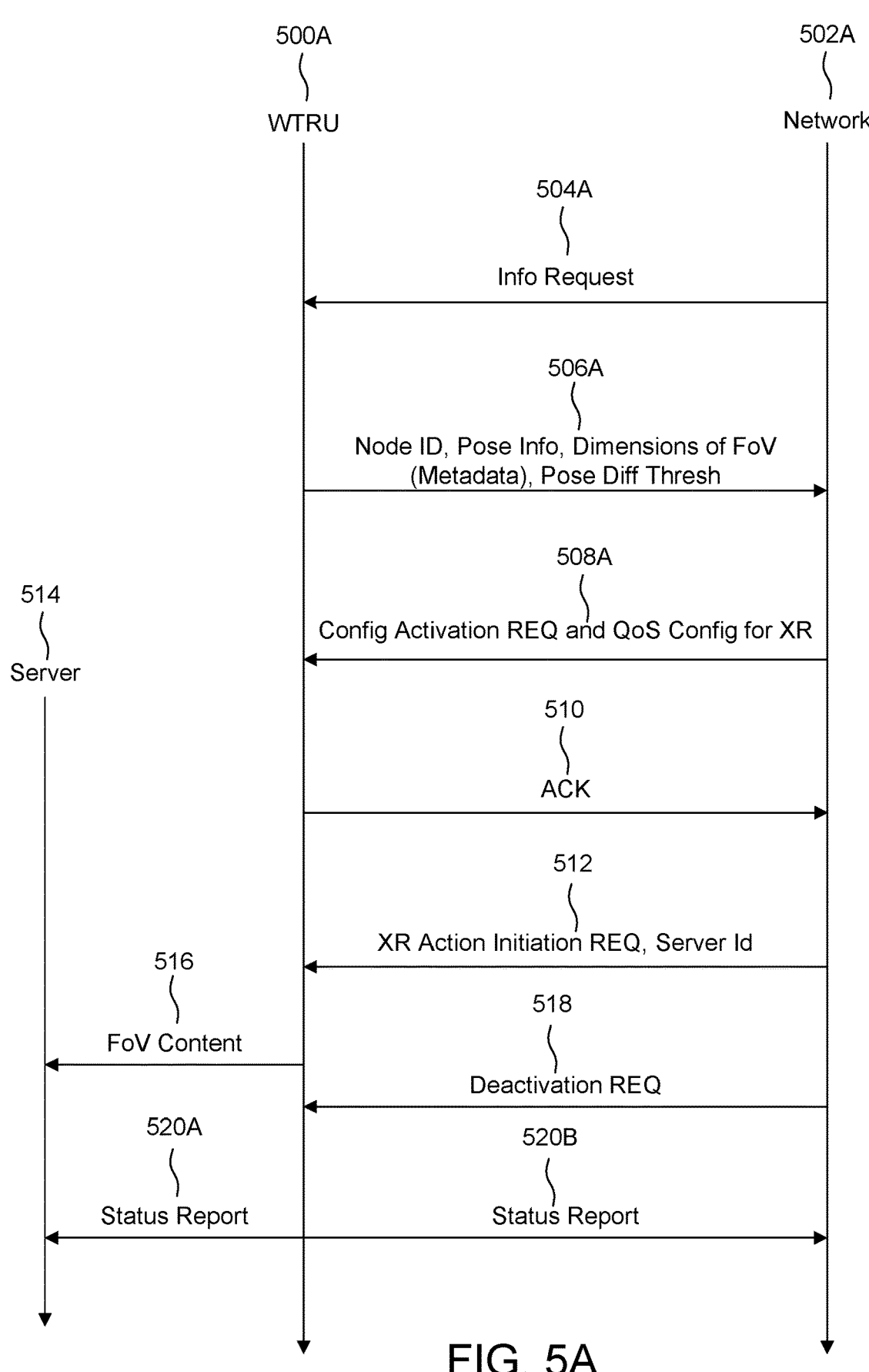
FIG. 5A is a signaling diagram depicting WTRU operation according to embodiments of a method of supporting device group for collaborative extended reality (XR)
Figure 5B:
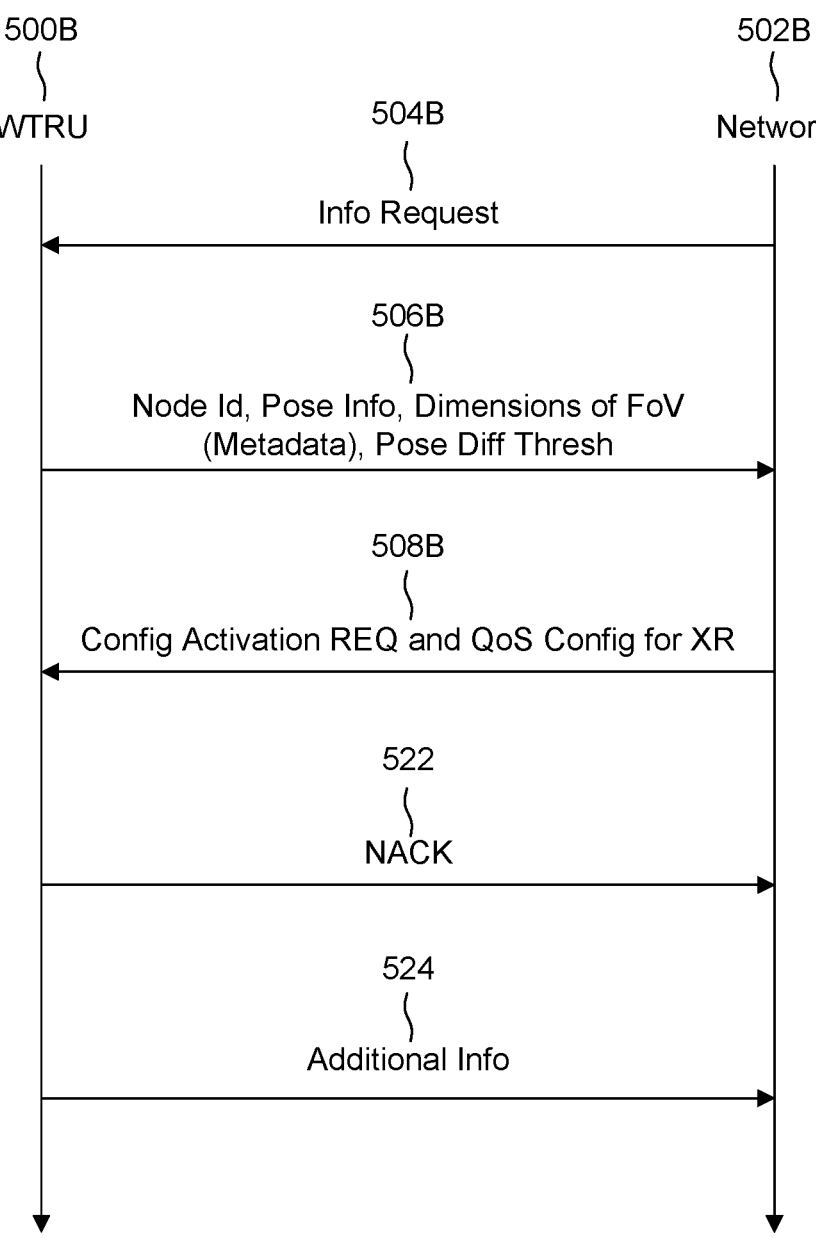
FIG. 5B is a signaling diagram depicting WTRU operation according to embodiments of a method of supporting device group for collaborative extended reality (XR)

FIG. 5A depicts message exchanges where an acknowledgement (ACK) is transmitted to a Network 502A from a WTRU 500A. FIG. 5B depicts message exchanges where a negative acknowledgement (NACK) is transmitted to a network 502B from a WTRU 500B. Although FIG. 5A and FIG. 5B have different responses (ACK and NACK respectively) to a request, the two situations share some common message types and may be compared side by side as described below. FIGS. 5A and 5B show the steps that may be involved in an embodiment:

a. At 504A (FIG. 5A) and 504B (FIG. 5B), node 500A (FIG. 5A) and 500B (FIG. 5B) receives a request, from network 502A (FIG. 5A) and 502B (FIG. 5B) (i.e., either network or WTRU), to send the following information:

i. Node ID;

ii. its pose information (e.g., position, orientation of node or camera within node);

iii. dimensions of FoV (metadata) of node 500A and 500B; and/or iv. pose difference threshold;

b. At 506A and 506B, node 500A and 500B sends information received from the request, to network 502A and 502B (i.e., either WTRU or network);

c. At 508A and 508B, node 500A and 500B receives a request (e.g., to activate its configuration) from network 502A and 502B (i.e., either network or WTRU), along with a selected QoS configuration to use for an XR action;

d. Node 500A or 500B sends ACK, at 510, or NACK, at 522, to respond to the request, depending on factors (e.g., load on its links, size of XR action, duration of XR action, number of XR actions/WTRUs node is currently serving, etc.);

e. If node 500A of FIG. 5A sent an ACK at 510, node 500A receives, at 512, from network 502A (i.e., network or WTRU), the following:

i. request to initiate XR action (e.g., FoV content capture); and/or ii. server ID of server 514 to which to send FoV content at 516 (e.g., indication from network may include data forwarding info (e.g., Node IDs/addresses/routing info) for forwarding data directly using its own Uu link;

f. If node 500B of FIG. 5B sent a NACK at 522, it may also send additional information at 524, such as:

i. Time node may become available; and/or ii. A different QoS configuration that the node may be able to support (e.g., the node may not be able to support a selected QoS configuration to use for an XR action but may be able to perform another XR action with a lower QoS configuration);

g. If node 500A or node 500B receives a request, at 508A and/or 508B, (FIG. 5A or FIG. 5B respectively) to activate its configuration, from network 502A and/or 502B (i.e., network or WTRU), with a different QoS configuration to use for an XR action, the node 500A and/or 500B (FIG. 5A or FIG. 5B respectively) may send, at 512 and/or 522, (ACK or NACK respectively), indicating whether it may support the requested QoS configuration for the XR action;

h. If, during an XR action (e.g., FoV capture or data transfer at 516 in FIG. 5A, node 500A of FIG. 5A receives a deactivation request at 518:

i. Node 500A stops the XR action (e.g., of either FoV content capture or transfer of captured data); and ii. Node 500A may send a status report, to either network 502A (i.e., WTRU or network) at 520B and/or server at 520A, to acknowledge end of the XR action request and indicate completion status of the XR action (e.g., percentage completion, areas of FoV content mapped/remaining to be mapped, etc.).

WTRU Uses Sidelink Interface for Collaborative Group Formation

In a family of solutions, a WTRU may use the sidelink interface to connect with one or more other WTRU(s) and determine whether the other WTRU(s) would be suitable candidates for the collaborative WTRU group. From a connectivity perspective, leveraging the sidelink interface of one or more WTRU(s) involved in the XR experience can alleviate the load on the Uu link. Bringing the coordination point locally to the anchor WTRU and using sidelink to communicate with other WTRUs in proximity may also allow for fast and efficient discovery of WTRUs with XR capabilities and enable fast connectivity establishment. Coordination, described herein, may include any procedures, functionalities and operations at one or more layers (e.g. access stratum/RAN layers, NAS layers, application layers) involving one or more WTRUs that may be associated with a common application/service (e.g. XR application). For example, the procedures and/or functionalities that may be performed via coordination may include discovery, WTRU selection, configuration, resource scheduling, power savings, link management, etc. The sidelink interface may facilitate coordination to be supported dynamically between WTRUs in the WTRU group to ensure continuity of the immersive experience to the user, based on locally available information such as pose and (extended) FoV.

When a WTRU meets one or more conditions/configured criteria to support collaborative XR, the WTRU may send an indication message to the other one or more WTRUs in the group directly via sidelink, possibly requesting to join the collaborative group. Such indication message may be sent by WTRU in response to detection of a triggering event, and/or reception of an indication/request message from anchor WTRU and/or network, for example. Conversely, when a WTRU (e.g., collaborative WTRU) does not meet one or more conditions/configured criteria to join the collaborative group, the WTRU may send an indication, for e.g., directly to the anchor WTRU via the sidelink interface to indicate rejection to join the WTRU group.

In an example, the collaborative WTRU may not send any response to a soliciting WTRU, possibly when any of the conditions/configured criteria are not satisfied. In an event when the soliciting WTRU sends a renewed request to the collaborative WTRU, possibly after a prohibit or reattempt time duration, the collaborative WTRU may either send another indication rejecting the request to join the collaborative group or the collaborative WTRU may re-assess whether the conditions to join the collaborative group are now fulfilled. The collaborative WTRU may re-run/re-assess all the conditions/configured criteria in the order of configuration, or it may prioritize the criteria/configured conditions that failed to meet the requirement in the previous assessment.

The conditions/criteria to join a collaborative group may be configured in the WTRU by any of the following:
  a. Application running the XR experience
  b. Network/gNB: For example, the WTRU may be configured by RAN (via RRC signaling, MAC CE, DCI), or CN
  c. Anchor WTRU and/or other collaborative WTRU: For example, the WTRU may be configured via the SL interface (e.g., via PC5 RRC, SL MAC CE, PSCSH, PSSSH)

In an example, collaborative group formation via sidelink may involve the use of one or more similar and/or overlapping criteria with that of the group formation performed over the Uu interface. For example, a WTRU may be able to join or form part of a collaborative group when the radio conditions (e.g., RSRP measurements) and load conditions (e.g., CBR measurements) over the SL interfaces and/or SL resource pools are below/above one or more configured threshold values (e.g., SL RSRP threshold, CDRX threshold).

SL-Based Discovery/Solicitation Procedure for Collaborative Group Formation

The discovery procedure for collaborative XR may involve a WTRU (e.g., anchor WTRU) making itself detectable to other WTRUs by sending discovery messages over the sidelink interface. Such discovery message may indicate the WTRU capability to support collaborative XR (e.g., FoV information), and/or AS/NAS-layer capability for supporting transmission/reception of CP/UP data, for example.

The WTRU (e.g., anchor WTRU or collaborative WTRU) may use a solicitation procedure to form the collaborative WTRU group based on transmission of one or more solicitation messages. The solicitation message may include a request to form a new collaborative group, request to join an existing collaborative group, request for a parameter/attribute associated with group formation, etc., for example. For example, a WTRU may inquire about other WTRU(s) in proximity to itself (e.g., within a set radius) by sending a solicitation message over the sidelink interface.

The transmission mode that may be applied for transmitting any discovery/solicitation messages may include broadcast (e.g., with broadcast ID that may be decoded by any WTRU in proximity), multicast/groupcast (e.g., with multicast/group ID that may be decoded by a set of WTRUs in a group and/or configured with multicast/group ID) or unicast (e.g., with unicast ID that may be decoded by a WTRU to which the transmission may be intended for), for example. Such transmissions of discovery/solicitation messages may be performed in SL over PC5 RRC, SL MAC CE, PSCCH or PSSCH, for example.

In an example, the SL discovery/solicitation messages may be transmitted by a WTRU periodically (e.g., based on a configured periodicity using periodic SL resources). Alternatively, a WTRU may transmit the discovery/solicitation messages aperiodically when detecting one or more triggering events, described herein. For example, the WTRU may change the periodicity used for transmitting discovery/solicitation messages based on the type of event detected for initiating the transmission of the messages and/or configured association information between the event type and periodicity. For example, the WTRU may transmit the discovery/solicitation message with higher periodicity when detecting an object associated with XR application and/or when the distance between an object and the collaborative WTRU increases/decreases above a threshold distance, for example.

In an example, both the anchor WTRU and/or collaborative WTRU may initiate the SL-based discovery/solicitation procedure by transmitting discovery/solicitation messages over the SL interface. For example, when a discovery message transmitted by a collaborative WTRU is received by an anchor WTRU, the anchor WTRU may determine whether to select the collaborative WTRU and/or admit the collaborative WTRU based on one or more configured conditions/criteria associated with XR application, SL channel/load conditions, and relative location/distance of the collaborative WTRU for example. For example, the anchor WTRU may select and/or admit the collaborative WTRU if the distance between the anchor WTRU and collaborative WTRU, possibly indicated in the discovery/solicitation message, is below a first distance threshold (e.g., corresponding to ensuring reliable SL communications) and above a second distance threshold (e.g., corresponding to ensuring minimal FoV overlap when supporting extended FoV application/service).

For receiving the discovery/solicitation messages, the WTRU (e.g., anchor WTRU and/or collaborative WTRU) may be configured with one or more reception occasions. Such reception occasions may be associated with time/frequency resources such as time slots, channels/subchannels, BWPs, resource pools, carriers, etc., may be configured in the WTRU by the network (e.g., via SIB or dedicated RRC signaling) or by another WTRU (e.g., anchor WTRU via SL). Such reception occasions may be dedicated for receiving messages associated with XR application/services or may be common for receiving any CP/UP data in SL.

In an example, a WTRU may be configured to periodically monitor one or more SL channels, receive any discovery/solicitation messages over SL that may be transmitted by the anchor WTRU and/or collaborative WTRU.

Once sidelink is established between one or more WTRUs in the group, either through discovery or solicitation, messages/indications/reports related to XR actions may be exchanged between anchor WTRU and collaborative WTRU including measurements/estimates related to pose information and/or FoV/extended FoV.

Exchanges over the sidelink may also be related to measurements/estimates of the radio link interfaces associated with any WTRU in the collaborative WTRU group (for example, channel/load conditions on the sidelink channel). In an exemplary solution, a collaborative WTRU may send an indication when the quality/load of the channel used by the WTRU (e.g., for performing XR actions) meets certain measurement criteria such as the RSRP/RSRQ/RRSI measurements of the channel (over the SL interfaces) and/or channel busy ratio (CBR) of the channel over SL interfaces is above/below the respective threshold values and/or remains above/below the respective threshold value for a certain duration.

Exchanges over the sidelink may include connectivity capabilities on the sidelink interface, for e.g., the number of carriers, bandwidth, WTRU antenna configuration, number of Tx/Rx antennas, the forwarding configurations that are supported over the sidelink interface, etc. The anchor WTRU may request for XR capabilities and connectivity capabilities from a collaborative WTRU, or the collaborative WTRU may send XR capabilities and connectivity capabilities information on itself in the discovery/solicitation messages. Capabilities exchange may also include application layer information such as spatial capability of WTRU (e.g., presence of camera, microphone, etc.) to enable participation in XR action.

UP data and related status reports associated with XR actions (e.g., signaling start or completion of action and/or milestone(s) of action) may also be sent between WTRUs in the group via the sidelink interface.

Triggering Events for Transmitting Discovery/Solicitation Messages

The anchor and/or collaborative WTRU may transmit discovery/solicitation messages via the sidelink interface based on a combination of one or more of the following triggering events:

a. During connectivity/session establishment and/or (re)configuration
   i. For example, during RRC connection, PDU session establishment, application session establishment and/or (re)configuration
b. When changing/updating XR actions
   i. For example, when starting new XR actions and/or releasing existing XR actions
c. When receiving higher layer/application information
   i. For example, when receiving an indication (e.g., from application function hosted in WTRU or in network) indicating change in XR actions, forwarding configurations, etc.
d. When detecting change in measurements and movements
   i. For example, when the RSRP, RSRQ, RSSI measurements of the signals, channels, radio links, carriers, etc., possibly associated with the one or more XR actions, are above/below configured threshold values
   ii. For example, when pose/positioning measurements (e.g., location information, pose in 6DoF) are above/below configured pose/positioning threshold values.
e. When detecting change in time/timing attributes
   i. For example, WTRU may transmit the messages periodically or when a timer associated with sending of assistance information is set and/or expires
f. When fulfilling network configured criteria
   i. For example, the WTRU may have received a configuration from the network indicating criteria or set of threshold values for a condition or set of conditions based on which it can be triggered to send information
g. When detecting any changes to the distances between WTRUs in group and/or distances to objects
   i. For example, the WTRU may transmit messages when estimated distance to other WTRUs and/or distances to objects associated with FoV and/or extended FoV are above/below one or more threshold values.

The WTRU may also initiate the transmission of discovery/solicitation messages when receiving a request message from the network and/or application. The network and/or application may have knowledge of the XR action and the candidate WTRU(s) in proximity and may send a request to anchor WTRU and/or collaborative WTRU to form a collaborative WTRU group to ensure XR experience continuity. The request messages received by WTRU from network/application may contain explicit indication (e.g., message indicating to anchor WTRU to connect with a WTRU in proximity via an indication in DCI) or implicit indication (e.g., message flagging insufficient bandwidth to support specific XR action hereby triggering the WTRU to initiate discovery/search for candidate WTRU(s) in proximity to enable XR experience).

In one embodiment, a receiving (candidate collaborating) WTRU may perform a method 600 presented in FIG. 6. At 605, a receiving WTRU, such as a possible candidate WTRU may receive a message from a transmitting WTRU, such as an anchor WTRU. The message may include an explicit or implicit invitation to join a collaborative group to support an XR activity. The received message may be one or more of a discovery message and/or a solicitation message for XR collaboration.

After receipt of the message at 605, the receiving WTRU may conduct either or both of the inquiries/checks at 610 or 615. For example, the receiving (candidate collaborative) WTRU may, at 610, check if the receiving WTRU XR capability is compatible with/matches with/aligns with/has capability commensurate with the received invitation message. If not, the receiving WTRU may move to 630 and optionally respond by declining the invitation message or provide no response. If at 610, the XR capability of the receiving WTRU is compatible with the received invitation message to join the collaborative XR group, then at 620, the receiving WRTU may determine at 625 to join the collaborative XR group based on its XR compatibility. The inquiry at 610 may include an evaluation using one or more of pose information and field of view (FoV) information of the receiving WTRU with respect to the initiating (transmitting/anchor) WTRU.

After the determination at 625, the receiving WTRU indicates its willingness to join the collaborative XR group by transmitting, on a sidelink connection, the XR capabilities of the receiving WTRU. At 625, transmitting pose information of the receiving WTRU may include sending one or more of orientation, location or position of the receiving WTRU and FoV parameters including direction, width, and metadata of FoV content.

The determination at 620 may be made by either or both of an inquiry at 610 or 615. If the receiving WTRU uses inquiry 615, then the receiving WTRU checks its sidelink (SL) connection with the transmitting (anchor) WTRU to detect if the sidelink connection quality is compatible to allow the receiving WTRU to be in a collaborating XR group to support the XR application of the transmitting (anchor) WTRU. If the sidelink quality is not of sufficient quality, then the process 600 may move to 630 and the invitation from the transmitting WTRU may be actively declined with a response message or may be declined by providing no response. At 615, the sidelink connection quality detection may include one or more of reference signal receive power (RSRP), reference signal receive quality (RSRQ), reference signal strength indicator (RSSI) and channel busy ratio (CBR) measurements of the sidelink channel with the transmitting (anchor) WTRU. If at 615, the sidelink quality is compatible with an XR collaboration activity, then the detection at 615 may move to 620 where a determination may be made by the receiving WTRU to join the collaborative XR group. It is noted that the determination at step 620 may be made using either or both of the detection of XR capability and/or sidelink quality. In either instance (XR capability at 610 or SL quality at 615), then the collaborating WTRU moves to 630 as described above.

A method performed by the transmitting (anchor) WTRU may be compatible with the above method 600 and may include transmitting, on a sidelink connection with at least one receiving WTRU, a discovery or solicitation message to join a collaborative extended reality (XR) action based on a combination of one or more of triggering events that may include a session establishment or reconfiguration between WTRUs, a changing or updating of the XR action, and/or upon detecting a change in measurements and movements affecting the XR action. As a result of sending a discovery or solicitation message to join a collaborative extended reality (XR) action, the receiving and accepting WTRU may send a response. The transmitting WTRU (anchor WTRU) receives the response which includes at least one message indicating XR capabilities of the receiving (collaborating) WTRU.

WTRU (Anchor) Engages in a Two-Step Selection/Determination Process to Determine the WTRUs that Will Form Part of its Collaborative WTRU Group In one solution, the anchor WTRU sends assistance information (pose and thresholds) to the NW and receives from the NW a set of candidate WTRUs (e.g., WTRU SL IDs). The anchor WTRU refines the selection based on per-WTRU FoV dimensions of candidate WTRUs exchanged between the anchor WTRU and the candidate WTRU(s) via sidelink.

WTRU (i.e. anchor WTRU) is configured to perform the following:

a. Receive application info, including extended Field-of View (FoV) dimensions for sensing and delay bound for transmitting data associated with the extended FoV in UL.

b. Transmit to NW, request for candidate collaborative WTRUs, pose info (location, orientation) of the anchor WTRU, and distance and/or orientation thresholds relative to the anchor WTRU for identifying candidate WTRUs.

c. Receive from NW, the candidate set of collaborative WTRUs (WTRU SL IDs), and associated pose info. Here, the NW selects/determines, for the anchor WTRU, a first set of candidate WTRUs responding to the request for candidate collaborative WTRUs.

d. Receive from candidate WTRUs (using WTRU SL IDs) per-WTRU FoV dimensions.

e. Select collaborative WTRUs from candidate set based on the candidate WTRUs' FoV dimensions, pose info, and application info. Here, the anchor WTRU selects/determines, from the first set of candidate WTRUs, the collaborative WTRUs that meet the XR requirements.

f. Transmit indication to NW on the selected collaborative WTRUs (e.g., WTRU SL IDs).

g. Transmit indications to selected collaborative WTRUs, indicating the minimum dimensions (metadata) of FoV expected to be captured during sensing and latency for reporting the sensing data in UL.

Figure 7A:
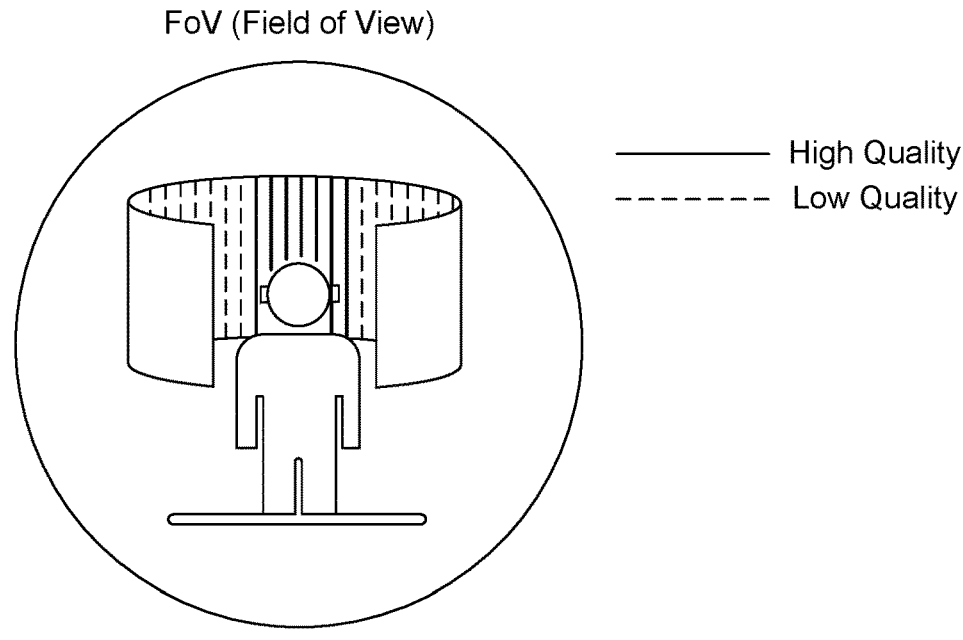
FIG. 7A depicts an example Field of View (FoV) experienced by a user of a wearable WTRU.

FIG. 7A depicts an example Field of View (FoV) experienced by a user of a wearable WTRU, such as a virtual reality (VR), augmented reality (AR), or extended reality (XR) headset/glasses. The user's headset/glasses may be referred to as an anchor WTRU. While wearing the headset/glasses, the user experiences high quality images directly in front of his/her viewing area. This high-quality viewing area can be the result of overlapping fields of view of collaborative WTRUs according to principles of collaborative WTRUs presented herein. At the periphery of the users FoV, the image quality may be decreased with respect to the direct front view. The lower quality view can be a result of fewer or no collaborative WTRUs assisting the anchor WTRU in image generation. In an example, the FoV dimensions or parameters may include vertical, horizontal, and depth dimensions for which visual sensing of the environment is performed by the WTRU and sent in the uplink (UL) to the XR application in the server which supports the XR application in an example system.

Figure 7B:
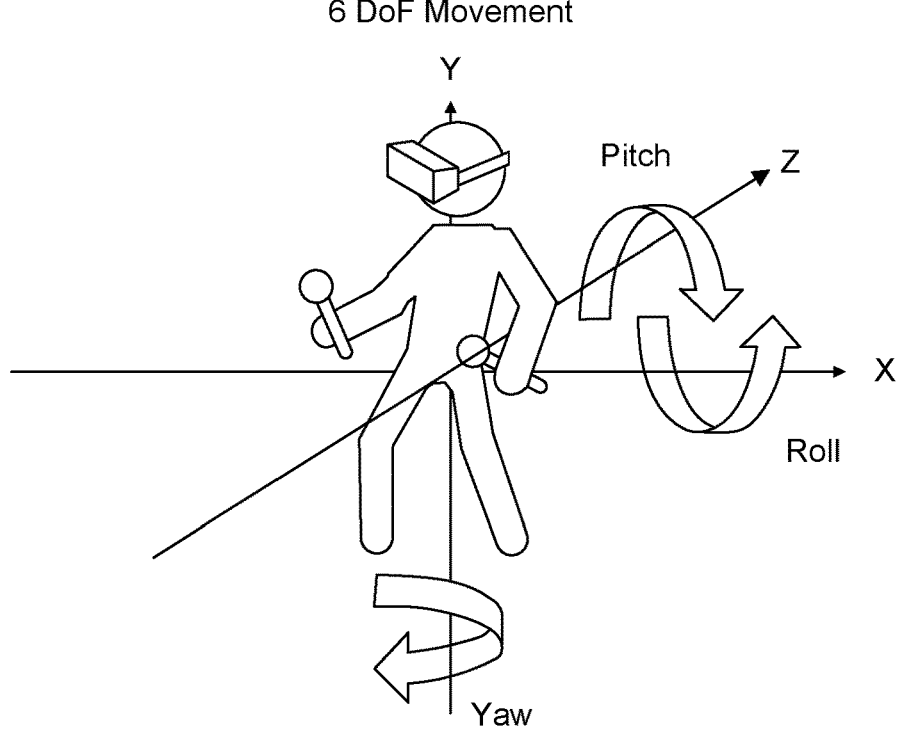
FIG. 7B depicts an example six degrees of freedom (6DoF) which assist in defining pose information.

FIG. 7B depicts an example six degrees of freedom (6DoF) which assist in defining pose information (location, and/or orientation) of an anchor WTRU worn by a user. Position (i.e., location) and orientation of an anchor WTRU in a coordinate system may include +/−X axis, +/−Y axis, an +/−Z axis, which may be assigned as roll, yaw, and pitch axis, respectively. As an option, spherical coordinates may also be used.

Figure 8:
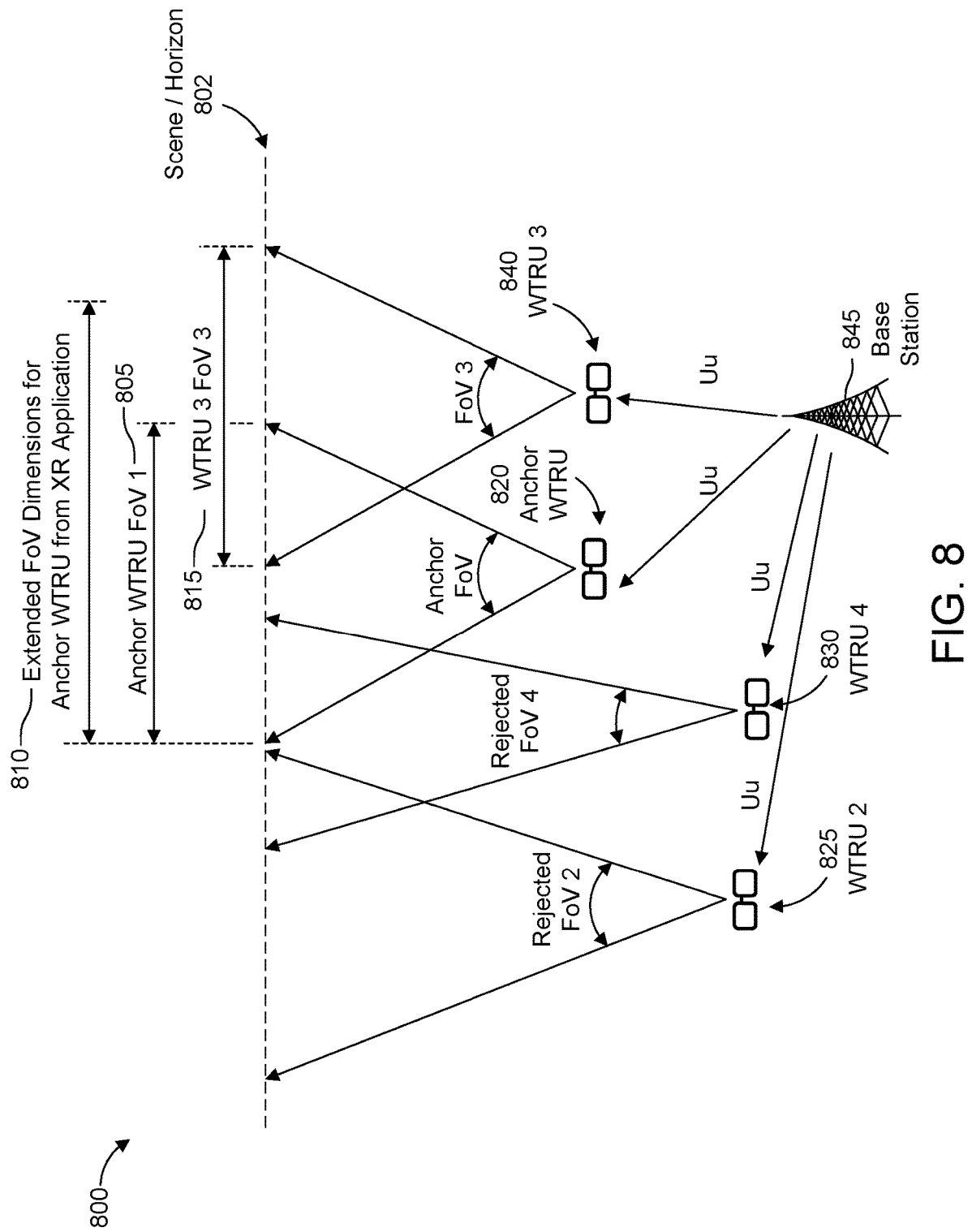
FIG. 8 depicts an example environment in which an embodiment of the disclosure may be practiced.

FIG. 8 depicts an example environment in which a two-step selection process to determine the WTRUs that will form part of its collaborative WTRU group may be practiced. The first step in the two-step selection process is performed by the NW BS. The second step in the two-step process is performed by the anchor WTRU. In FIG. 8, an anchor WTRU 820 has a direct view of a scene or horizon 802 to which the anchor WTRU is viewing. The anchor WTRU also has an associated angular FoV which encompasses a portion of the scene or horizon 802. Viewed linearly along the scene/horizon, the anchor WTRU FoV 1 may be traced along the scene/horizon 802 as shown in 805. Other WTRUs also have other FoVs which encompass a portion of the scene/horizon 802. For example, WTRU 2 (825) has an angular FoV 2, and WTRU 4 (830) has an angular FoV 4. WTRU 3 (840) has an angular FoV 3, which when viewed linearly along the scene/horizon 802 may be traced along the scene/horizon 802 as shown in 815. All WTRUs have a Uu type connection to a base station (BS) 845, such as a gNB, or other BS type depending on the network type that is present to support the XR system. An extended FoV dimension for the Anchor WTRU from the XR application 810 is wider than the FoV 1 of the anchor WTRU 820. This is due to the XR application using a collaborative WTRU to assist in the widening of the anchor WTRU FoV 1 to the extended FoV 810.

Descriptively, in FIG. 8, the anchor WTRU 820 may transmit a request to the NW BS to request for a set of candidate collaborative WTRUs. The anchor WTRU may transmit pose information, which may include location and orientation information of the anchor WTRU 820. The anchor WTRU may receive from the NW BS, a selection (the first step selection) of a candidate set of collaborative WTRUs, such as WTRUs, WTRU 2 (825), WTRU 3 (840), and WTRU 4 (830). The reception of the first selection by the NW BS or the collaborative WTRUs may include the WTRU SL IDs and their associated pose information.

The anchor WTRU 820 may access the FoV dimensions or parameters of the NW provided WTRUs. If the anchor WTRU 820 does not have the FoV dimensions (parameters) of the candidate WTRUs, then the anchor WTRU 820 may access the FoV information from each candidate WTRU using a SL communication and the candidate WTRU SL ID. Once the anchor WTRU has the FoV dimensions (parameters) of the candidate WTRUs, then the anchor WTRU 820 can perform a selection (the second step selection) of the candidate WTRUs that the anchor WTRU is to use.

The anchor WTRU 820 selects collaborative WTRUs (the second step selection) from the candidate set of WTRUs provided by the NW BS (the first step selection) based on an indication of the candidate's FoV dimensions (parameters, such as the FoV metadata), pose information, validity duration, and application information. For example, in FIG. 8, the anchor WTRU 820 may select WTRU 3 (840) to be a collaborative WTRU for the XR application based on the level of overlap of sensing data between WTRU 3 FoV 3 dimension (depicted by 815) and the extended FoV dimension (depicted by 810) determined by the XR application. WTRU 2 (825) and WTRU 4 (830) may be rejected by the anchor WTRU 820 because the FoV 2 of WTRU 2 and the FoV 4 of WTRU 4 do not overlap enough with the anchor WTRU 820 FoV 1 (depicted at 805) or the extended FoV dimensions for the anchor WTRU 820 from the XR application (as depicted by 810). Thus, in the FIG. 8 example the first selection of potential collaborative WTRUs was provided by the NW BS 845. A second selection of collaborative WTRUs was made by the anchor WTRU 820.

An example method 900 to select collaborative WTRUs for an XR application is depicted in FIG. 9. The example method 900 is performed by an anchor WTRU. At 905, an anchor WRTU transmits to a base station (BS) a request for a candidate set of collaborative WTRUs, the request includes pose information parameters to assist the BS to identify a candidate set of collaborative WTRUs to be used in/for the XR application that the anchor WTRU is to perform. The anchor WTRU may have knowledge of the XR application parameters which assists the anchor WTRU in requesting the candidate set of WTRUs. The NW BS can then use the XR application parameters received from the anchor WTRU to assist in the selection of a candidate set of WTRUs. At 910, the anchor WTRU receives from the BS a first set of collaborative WTRUs. The first set of collaborative WTRUs may match/align with the pose information dimensions (parameters) sent by the anchor WTRU. The anchor WTRU may receive the first set of candidate collaborative WTRUs along with or identified by their respective sidelink identifiers and associated pose information.

The method step at 915 may be skipped if the anchor WTRU already has specific FoV metadata and/or pose information concerning members of the first candidate set of WTRUs provided by the NW BS. If the anchor WTRU does not have the specific information of the FoV and/or pose information of the candidate members of the first set of potential collaborative WTRUs, the step 915 may be undertaken. At 915, the anchor WTRU may request from at least one and possibly all candidate WTRUs their respective FoV information and/or pose information. Such a request may be made via a SL communication with the one or more candidate collaborative WTRU using the SL ID information provided by the NW BS. The anchor WTRU receives respective FoV and/or pose information from the candidate collaborative WTRUs. The anchor WTRU may transmit, to the selected collaborative WTRUs, an indication of FoV dimensions used in conjunction with the XR application of the anchor WTRU. In doing so, the anchor WTRU may transmit via SL to any one or more of the candidate collaborative WTRUs a requirement of (i) FoV parameters (dimension information or other metadata) expected to be captured during sensing data (e.g. FoV information/parameters/metadata) acquisition and/or (ii) latency reporting of the sensing data in an uplink communication to the selected collaborative WTRUs.

At 920, the anchor WTRU selects/determines, a second set of WTRUs from the first set of WTRUs that match/align with at least one of the FoV, pose information (parameters), location, duration, etc. of the anchor WTRU that is operating with the XR application. The matching may include selecting candidate collaborative WTRUs based on FoV and/or pose or other information that comports with, or is oriented with, or is similar in orientation to the FoV, pose, and/or other information. The matching/alignment may allow the XR application operating with the anchor WTRU to expand the effective FoV of the anchor WTRU.

At 925, the anchor WTRU transmits, to the BS, an indication of the second set of WTRUs as the selected collaborative WTRUs. This informs the BS that specific WTRUs are favored by the anchor WTRU given the location, pose information, etc. of the anchor WTU. The indication of the anchor WTRU's selected collaborative WTRUs may include the SL IDs of the selected collaborative WTRUs. The identification of the selected collaborative WTRUs informs the BS that the selected collaborative WTRUs may not be available to other anchor WTRUs and may be favored by the anchor WTRU in the future.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, MME, EPC, AMF, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU")

and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the various embodiments have been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A method performed by an anchor wireless transmit/receive unit (WTRU) having an Extended Reality (XR) application, the method comprising:
   transmitting, to a base station (BS), a request for a candidate set of collaborative WTRUs, the request including location parameters to identify the candidate set of collaborative WTRUs;
   receiving, from the BS, a first set of collaborative WTRUs associated with the location parameters;
   selecting, by the anchor WTRU, a second set of WTRUs from the first set of WTRUs that are compatible with Field of View (FoV), pose information, and the XR application of the anchor WTRU; and
   transmitting, to the BS, an indication of the second set of WTRUs as selected collaborative WTRUs.

2. The method of claim 1, further comprising:
   transmitting, to the selected collaborative WTRUs, an indication of FoV dimensions used in conjunction with the XR application of the anchor WTRU.

3. The method of claim 1, wherein receiving, from the BS, the first set of collaborative WTRUs further comprises receiving a first set of WTRUs that align with pose information of the anchor WTRU.

4. The method of claim 1, wherein selecting, by the anchor WTRU, the second set of WTRUs is preceded by:
   transmitting, to one or more WTRUs of the first set of WTRUs, a request to provide FoV information to the anchor WTRU; and
   receiving FoV information from the one or more WTRUs of the first set of WTRUs.

5. The method of claim 4, wherein receiving FoV information comprises receiving the FoV information via sidelink from a responding WTRU.

6. The method of claim 4, wherein transmitting, to the one or more WTRUs of the first set of WTRUs, a request to provide FoV information to the anchor WTRU further comprises transmitting a requirement of (i) FoV parameters expected to be captured during acquisition of sensing data and (ii) latency reporting of the sensing data in an uplink communication to the selected collaborative WTRUs.

7. The method of claim 1, wherein transmitting to the BS the request for the candidate set of collaborative WTRUs further comprises transmitting pose information of the anchor WTRU, and at least one of a minimum distance and orientation requirement relative to the anchor WTRU.

8. The method of claim 1, wherein receiving, from the BS, the first set of collaborative WTRUs comprises receiving a set of WTRU sidelink identifiers and associated location parameters of respective WTRUs in the first set of collaborative WTRUs.

9. The method of claim 1, wherein transmitting, to the BS, an indication of the second set of WTRUs comprises transmitting sidelink identifiers of the second set of WTRUs.

10. An anchor wireless transmit/receive unit (WTRU) having an Extended Reality (XR) application, the anchor WTRU comprising circuitry, including a transmitter, a receiver, a processor, and memory, the anchor WTRU configured to:

transmit, to a base station (BS), a request for a candidate set of collaborative WTRUs, the request including location parameters to identify the candidate set of collaborative WTRUs;

receive, from the BS, a first set of collaborative WTRUs associated with the location parameters;

select, by the anchor WTRU, a second set of WTRUs from the first set of WTRUs that are compatible with Field of View (FoV), pose information, and XR application parameters of the anchor WTRU; and transmit, to the BS, an indication of the second set of WTRUs as selected collaborative WTRUs.

11. The anchor WTRU of claim 10, further configured to transmit, to the selected collaborative WTRUs, an indication of FoV dimensions used in conjunction with the XR application of the anchor WTRU.

12. The anchor WTRU of claim 10, further configured to receive, from the BS, the first set of collaborative WTRUs that align with the pose information.

13. The anchor WTRU of claim 10, further configured to, before determining a second set of WTRUs:

transmit, to one or more of the WTRUs of the first set of WTRUs, a request to provide FoV information to the anchor WTRU; and receive FoV information from the one or more of the WTRUs of the first set of WTRUs.

14. The anchor WTRU of claim 13, configured to receive FoV information via sidelink from a responding WTRU.

15. The anchor WTRU of claim 13, configured to transmit, to the one or more WRTUs of the first set of WTRUs, a request to provide FoV information to the anchor WTRU by transmitting a requirement of (i) FoV parameters expected to be captured during acquisition of sensing data and (ii) latency reporting of the sensing data in an uplink communication to the selected collaborative WTRUs.

16. The anchor WTRU of claim 10, configured to transmit the request for the candidate set of collaborative WTRUs by transmitting pose information of the anchor WTRU and at least one of a minimum distance and orientation requirement relative to the anchor WTRU.

17. The anchor WTRU of claim 10, configured to receive the first set of collaborative WTRUs by receiving a set of WTRU sidelink identifiers and associated location parameters of respective WTRUs in the first set of collaborative WTRUs.

18. The anchor WTRU of claim 10, configured to transmit, to the BS, an indication of the selected collaborative WTRUs by transmitting sidelink identifiers of the selected WTRUs to the BS.

19. A non-transient computer-readable storage medium comprising instructions which when executed by a computer cause the computer to carry out the method comprising:

transmitting, to a base station (BS), a request for a candidate set of collaborative WTRUs, the request including location parameters to identify the candidate set of collaborative WTRUs;

receiving, from the BS, a first set of collaborative WTRUs associated with the location parameters;

selecting, by the anchor WTRU, a second set of WTRUs from the first set of WTRUs that are compatible with Field of View (FoV), pose information, and an Extended Reality (XR) application of the anchor WTRU; and transmitting, to the BS, an indication of the second set of WTRUs as selected collaborative WTRUs.

20. The non-transient computer-readable storage medium of claim 19, wherein transmitting to the BS the request for the candidate set of collaborative WTRUs further comprises transmitting pose information of the anchor WTRU, and at least one of a minimum distance and orientation requirement relative to the anchor WTRU.

* * * * *